United States Patent
Hansen et al.

(10) Patent No.: US 11,433,302 B2
(45) Date of Patent: Sep. 6, 2022

(54) INTERACTIVE PLAY APPARATUS

(71) Applicant: LEGO A/S, Billund (DK)

(72) Inventors: Erik Hansen, Billund (DK); Jesper Søderberg, Billund (DK); Thomas Alan Donaldson, Billund (DK); Martin Møller Jensen, Billund (DK)

(73) Assignee: LEGO A/S, Billund (DK)

( * ) Notice: Subject to any disclaimer, the term of this patent is extended or adjusted under 35 U.S.C. 154(b) by 9 days.

(21) Appl. No.: 16/754,818

(22) PCT Filed: Oct. 16, 2018

(86) PCT No.: PCT/EP2018/078144
§ 371 (c)(1),
(2) Date: Apr. 9, 2020

(87) PCT Pub. No.: WO2019/076845
PCT Pub. Date: Apr. 25, 2019

(65) Prior Publication Data
US 2021/0187389 A1    Jun. 24, 2021

(30) Foreign Application Priority Data

Oct. 16, 2017 (DK) .......................... PA 2017 70783

(51) Int. Cl.
*A63F 13/42* (2014.01)
*A63F 13/213* (2014.01)
(Continued)

(52) U.S. Cl.
CPC ............ *A63F 13/42* (2014.09); *A63F 13/213* (2014.09); *A63F 13/215* (2014.09);
(Continued)

(58) Field of Classification Search
CPC ........ A63F 13/23; A63F 13/213; A63F 13/42; A63F 13/217; A63F 13/28; A63F 13/215
See application file for complete search history.

(56) References Cited

U.S. PATENT DOCUMENTS 6,461,238 B1 * 10/2002 Rehkemper ............. A63F 13/08
463/6
6,560,511 B1 * 5/2003 Yokoo .................... A63H 11/00
700/245

(Continued)

FOREIGN PATENT DOCUMENTS

EP   2713369 A1   4/2014
EP   3042704 A1   7/2016
(Continued)

OTHER PUBLICATIONS

Danish Search Report issued in priority application No. PA 2017 70783, dated Apr. 12, 2018.
(Continued)

*Primary Examiner* — Reginald A Renwick
(74) *Attorney, Agent, or Firm* — Day Pitney LLP; Anthony A. Kassas

(57) ABSTRACT

An interactive play apparatus comprising: an input device configured to receive an input from a user, one or more communications interfaces, and one or more processors, wherein the one or more processors are configured to: detect one or more electronic devices; for each detected electronic device, determine one or more capabilities of said electronic device; receive one or more inputs via the input device; determine one or more user-perceptible play actions based at least in part on the received one or more inputs; translate the determined one or more play actions into one or more instructions operable to cause one or more of the detected electronic devices to perform one or more functions that at least approximate the determined one or more play actions;
(Continued)

wherein the translation is based at least in part on the detected one or more capabilities of the respective detected electronic devices; cause the one or more of the detected electronic devices to perform said one or more functions.

21 Claims, 7 Drawing Sheets

(51) Int. Cl.
    *A63F 13/215*     (2014.01)
    *A63F 13/217*     (2014.01)
    *A63F 13/23*     (2014.01)
    *A63F 13/28*     (2014.01)

(52) U.S. Cl.
    CPC ............ *A63F 13/217* (2014.09); *A63F 13/23* (2014.09); *A63F 13/28* (2014.09); *A63F 2300/1025* (2013.01); *A63F 2300/1081* (2013.01); *A63F 2300/1087* (2013.01); *A63F 2300/302* (2013.01)

(56) References Cited

U.S. PATENT DOCUMENTS

| | | | | |
|---|---|---|---|---|
| 6,564,108 | B1* | 5/2003 | Makar | H05B 47/18 700/17 |
| 6,773,325 | B1* | 8/2004 | Mawle | A63F 13/02 446/175 |
| 6,937,289 | B1* | 8/2005 | Ranta | H04N 7/085 348/460 |
| 7,221,104 | B2* | 5/2007 | Lys | H05B 47/10 315/291 |
| 7,338,377 | B2* | 3/2008 | Shinoda | G07F 1/06 463/47 |
| 7,764,026 | B2* | 7/2010 | Dowling | A63F 13/28 315/307 |
| 9,274,747 | B2 | 3/2016 | Fuller et al. | |
| 9,457,281 | B1* | 10/2016 | Lam | A63H 33/00 |
| 9,636,576 | B2* | 5/2017 | Tokunaga | A63F 13/24 |
| 9,833,695 | B2* | 12/2017 | Yano | A63F 13/235 |
| 10,315,119 | B2* | 6/2019 | Reiche | A63F 13/95 |
| 10,583,352 | B2* | 3/2020 | Burton | A63F 9/24 |
| 2004/0082385 | A1* | 4/2004 | Silva | G07F 17/32 463/40 |
| 2004/0092311 | A1* | 5/2004 | Weston | A63F 13/80 463/42 |
| 2004/0157658 | A1* | 8/2004 | Rothkranz | G07F 17/3216 463/20 |
| 2004/0160199 | A1* | 8/2004 | Morgan | A01M 1/04 315/312 |
| 2005/0116667 | A1* | 6/2005 | Mueller | G09F 19/22 315/312 |
| 2006/0252541 | A1* | 11/2006 | Zalewski | A63F 13/211 463/36 |
| 2007/0167217 | A1* | 7/2007 | Kaminkow | G07F 17/32 463/20 |
| 2013/0107131 | A1 | 5/2013 | Barnett et al. | |
| 2013/0332542 | A1 | 12/2013 | Foo et al. | |
| 2014/0162785 | A1* | 6/2014 | Reiche | A63F 13/12 463/35 |
| 2014/0179446 | A1* | 6/2014 | Zuniga | A63H 33/26 463/47 |
| 2014/0273721 | A1* | 9/2014 | Katan | A63H 3/36 446/268 |
| 2015/0243286 | A1 | 8/2015 | Goslin et al. | |
| 2016/0144283 | A1* | 5/2016 | Martin | A63F 13/825 463/29 |
| 2016/0166927 | A1* | 6/2016 | Leyland | A63F 13/52 463/31 |
| 2016/0292955 | A1* | 10/2016 | Gronkowski | G07F 17/3269 |
| 2016/0325180 | A1* | 11/2016 | Nelson | A63F 13/215 |
| 2016/0357524 | A1 | 12/2016 | Maluf et al. | |
| 2017/0005874 | A1 | 1/2017 | Banerjee et al. | |
| 2017/0063999 | A1 | 3/2017 | Adrangi et al. | |
| 2017/0232358 | A1 | 8/2017 | Goslin et al. | |
| 2018/0078863 | A1* | 3/2018 | Nielsen | A63F 13/98 |
| 2018/0117465 | A1* | 5/2018 | Voris | A63F 13/26 |
| 2019/0099668 | A1* | 4/2019 | Aliakseyeu | H05B 47/155 |
| 2019/0174607 | A1* | 6/2019 | Broers | H05B 47/11 |
| 2019/0240568 | A1* | 8/2019 | Routhier | A63F 13/25 |
| 2021/0191508 | A1* | 6/2021 | O'Neil | G10H 1/0083 |

FOREIGN PATENT DOCUMENTS

| | | |
|---|---|---|
| GB | 2448883 A9 | 11/2008 |
| WO | 2000/009229 A1 | 2/2000 |
| WO | 2009/047225 A1 | 4/2009 |
| WO | 2016075081 A1 | 5/2016 |

OTHER PUBLICATIONS

International Search Report and the Written Opinion of the International Searching Authority issued in corresponding International application No. PCT/EP2018/078144, dated Nov. 22, 2018.

Examination Report issued in corresponding European patent application No. 18788747.6, dated Feb. 3, 2022, 7 pages.

Darrous, Hadi, "Lego Mindstorms NXT 2.0—Chess playing robot—Charlie", Jun. 8, 2015, XP055884487, Retrieved from the Internet: https://www.youtube.com/watch?v=y3gJ2ERa0_8 (retrieved Jan, 27, 2022).

* cited by examiner

INTERACTIVE PLAY APPARATUS

The present invention relates to an interactive play apparatus.

CROSS-REFERENCE TO RELATED APPLICATIONS

This application is a U.S. National Stage of International Application No. PCT/EP2018/078144, filed on 16 Oct. 2018 and published on 25 Apr. 2019, as WO 2019/076845 A2, which claims the benefit of priority to Danish Patent Application No. PA 2017 70783, filed on 16 Oct. 2017. The content of each of the above referenced patent applications is incorporated herein by reference in its entirety for any purpose whatsoever.

BACKGROUND OF THE INVENTION

There exist a variety of interactive play apparatus that allow a user to engage in various play scenarios.

For example, programmable toys are known e.g. from the product ROBOTICS INVENTION SYSTEM from LEGO MINDSTORMS, which is a toy that can be programmed by a computer to perform unconditioned as well as conditioned actions.

WO 2009/047225 discloses a toy construction system comprising a plurality of toy construction elements, including function construction elements for performing a corresponding function. This prior art system further comprises a data processing system that provides a programming environment for generating logic commands for controlling the function elements. The above prior art system includes an interface construction element that detects the function construction elements connected to the interface construction element and that sends information indicative of connected function construction elements to the data processing system. The data processing system provides an adapted programming environment responsive to the received information about at least the presence of the connected function construction element.

While the above prior art system provides interesting game play where a programming environment is adapted to the devices that are connected to the system, it remains desirable to provide an interactive play apparatus that provides an increased adaptability to the environment within which it is operated.

Generally, there remains a need for improved interactive play apparatus that foster children's imagination in a playful and entertaining manner.

SUMMARY

In accordance with at least a first aspect disclosed herein, an interactive play apparatus comprises:
  an input device configured to receive an input, e.g. from an environment of the play apparatus or from a user,
  one or more communications interfaces,
  one or more processors;
wherein the one or more processors are configured to:
  a) detect one or more electronic devices;
  b) for each detected electronic device, determine one or more capabilities of said electronic device;
  c) receive one or more inputs via the input device;
  d) determine one or more user-perceptible play actions based at least in part on the received one or more inputs;
  e) translate the determined one or more play actions into one or more instructions operable to cause one or more of the detected electronic devices to perform one or more functions that at least approximate the determined one or more play actions; wherein the translation is based at least in part on the detected one or more capabilities of the respective detected electronic devices;
  f) cause the one or more of the detected electronic devices to perform said one or more functions.

Accordingly, rather than limiting the inputs available to the user dependent on what electronic devices are available, embodiments of the interactive play apparatus accept the inputs from the user. Embodiments of the interactive play apparatus then interpret the received inputs so as to determine play actions that can be perceived by the user, and then translates these play actions into instructions to the detected electronic devices such that the electronic devices, given their detected capabilities, at least approximate the determined one or more play actions. Hence, the interactive play apparatus creates simulated play actions that approximate the determined play actions as closely possible or desirable given the available electronic devices.

The interactive play apparatus thus allows implementation of a play experience irrespective of the specific electronic devices that are available. To this end the interactive play apparatus adapts the play experience to the available devices so as to provide at least an approximation of the play actions that result from the received inputs. Moreover, this adaptive response to the received inputs does not require complicated programming steps to be performed by the user. Even untrained users can easily engage in interesting and creative play experiences.

In some embodiments, the one or more processors execute computer-executable program code that is configured to cause the interactive play apparatus to implement a digital play experience that includes control of electronic devices. The electronic devices may be a part of the interactive play apparatus or they may be external to the interactive play apparatus. Examples of such a digital play experience include a game where the user controls one or more physical objects that can be influenced by the electronic devices, or a play experience where movements of the user are translated into music, sounds, lighting effects and/or the like, or a play experience where the interactive play apparatus records and processes a narrative told by the user and where the interactive play apparatus controls the electronic devices to perform functions responsive to aspects of the recorded narrative, e.g. so as to illustrate aspects of the narrative, e.g. so as to represent or even "play out" at least parts or aspects of the narrative in the physical world.

Determining the one or more play actions may be done in a variety of ways. In some embodiments, the received input is a direct representation of a play action intended by the user, e.g. when the received input represents a specific command. Generally, the determination of the play actions may be based on predetermined play rules, i.e. rules that determine the response of the interactive play apparatus to a user input. Accordingly, the interactive play apparatus may comprise a storage medium having stored thereon a set of play rules. In some embodiments, the determined play actions may not only depend on the received input but also on other parameters, such as a current state of the play experience, on previous user inputs by the same user and/or by other users, on trigger events, etc. In some embodiments the determination may include one or more random or quasi-random aspects. For example, when the play experience involves a game where the user controls a physical object that can be affected by the electronic devices, the reaction of the physical object may depend on the current state of the game, e.g. on a current energy level or damage level assigned to the physical object by the play system. In some embodiments, the determination of the play action involves a certain level of interpretation, e.g. so as to determine a likely intention of the user. For example, in a play scenario where user movements are detected by an input device of the interactive play apparatus and result in a control of different colored light armatures, the determination of a play action may involve a transformation of detected user gestures into parameters such as illumination strengths, light color, blinking frequency of a blinking light and/or other parameters that characterise an illumination effect. In yet other embodiments, where the interactive play apparatus records voice commands or natural language, natural language elements may need to be processed so as to discern a play action. For example, the voice command "GO" may refer to the start of functionality, e.g. starting to play a tune, or it may refer to a forward movement of a vehicle, or the like. In some embodiments, the determination of the play actions also depends on the detected electronic devices, e.g. on their capabilities and/or on other attributes associated with them. For example, the interactive play apparatus may determine a play action that can be implemented by one or more of the detected electronic devices with a high degree of accuracy or that otherwise corresponds to the capabilities and/or other attributes of the detected electronic devices. Alternatively or additionally, the interactive play apparatus may determine the most likely intention of the user based at least in part on the received input and on a knowledge of the detected electronic devices. For example, when processing voice inputs, the detected electronic devices may provide a context in which the voice inputs are interpreted by a natural language processing engine of the interactive play apparatus.

Once determined, the play actions are translated into actual instructions for causing one or more of the detected electronic devices to perform one or more functions that at least approximate the determined one or more play actions. To this end, the interactive play apparatus may select one or more of the detected electronic devices and determine instructions for causing the selected one or more electronic devices to perform the one or more functions that at least approximate the determined one or more play actions. In some embodiments, the interactive play apparatus determines, based at least on the determined capabilities, which one or more of the detected electronic devices are most suitable for performing, or at least approximating, the determined one or more play actions, and select the one or more electronic devices that are determined as being most suitable. This determination may be based on a set of selection rules, e.g. a heuristic rule, a correspondence table that maps predetermined play actions to predetermined capabilities and/or to electronic devices, an optimisation process operable to minimize a predetermined cost function, etc., and/or a combination thereof. In particular, in some embodiments, translating the determined one or more play actions comprises:

selecting one or more of the electronic devices based on the determined one or more play actions and the determined capabilities;
    determining, based on the determined capabilities of the selected electronic devices and on the determined one or more play actions; the instructions for the selected electronic devices.

In some embodiments, a play action may be represented by functions of more than one electronic device. In some embodiments a play action may even involve an interaction of multiple electronic devices with each other. For example, one electronic device may acquire sensor data and communicate the acquired sensor data to another electronic device. This may cause the other electronic device to perform a corresponding function responsive to the received sensor data. Accordingly, in some embodiments, the instructions include instructions configured to cause two or more of the detected electronic devices to interact with each other.

The determination of the play actions and the translation into instructions may be performed as separate, consecutive steps. Alternatively, they may be performed as a combined step. One or both of these steps may be performed based on suitable sets of rules, e.g. rules mapping received inputs to play actions or rules mapping play actions to instructions, or even a combination thereof. For example, the play actions and/or instructions may be determined from the received inputs and from a set of play rules e.g. rules that define the rules for game progression of a game or that otherwise associate received inputs with an evolution of the play experience. The play rules may be simple deterministic rules that directly map certain user inputs to certain output actions while other examples of play rules may be more complex, e.g. depending on chance, environmental factors, actions of other players in a multiplayer play apparatus, etc. Alternatively, one or both steps may be performed by an artificial intelligence engine, a machine learning engine such as a suitably trained neural network, or another suitable computer-implemented process. In some embodiments, the processor is configured to determine a status of the performed one or more functions. This processor may then use the determined status for triggering subsequent instructions to the same or a different electronic device. To this end, the processor may be configured to base a determination of one or more subsequent user-perceptible play actions and or a translation of a subsequent play action into one more instructions at least in part on the determined status. The status of the performed one or more functions may include a determination as to whether the function has been performed by the corresponding electronic device or a degree to which the function has been performed. The processor may determine the status in a variety of ways, e.g. by receiving an acknowledgment message from the electronic device. Alternatively, or additionally, the play apparatus may comprise a sensor configured to detect the status, and the processor may receive a sensor signal from the sensor indicative of the detected status. For example, the play apparatus may include a light sensor or a sound sensor; when the processor has caused an electronic device to emit light or sound, the light or sound sensor may detect the emitted light or sound. The processor may then cause the same and/or another electronic device to perform another function in response to the detected light or sound. In this manner, the processor is capable of controlling play actions that involve multiple function to be performed responsive to each other. In this manner, the play apparatus may simulate an interaction between different electronic devices and/or between the play apparatus and one or more electronic devices. Examples of received sound inputs may include sounds made by a user, e.g. recorded voice, laughter, utterances, clapping, and/or sounds made by an electronic device. The processor may then trigger other functions responsive to the received audio input. It will be appreciated that the play apparatus may include alternative or additional sensors, e.g. a proximity sensor, a motion sensor, etc.

Determining and/or translating a play action may be controlled by a cost function where different candidate play actions and/or different instructions are assigned an associated cost, and the process may select a play action and/or instruction that involves the lowest cost. The cost associated with a play action and/or instructions may be calculated based on the currently processed input, i.e. by defining a likelihood measure indicative of how likely a play action and/or instruction matches the received input (a high likelihood may thus correspond to a low cost).

The determination of play actions and/or instructions may at least in part be based on feedback inputs or example instructions received from the user.

In some embodiments, the processor is configured to receive one or more environmental inputs indicative of an environmental parameter and wherein determining the one or more user-perceptible play actions and/or translating the determined one or more play actions is based at least in part on the received one or more environmental inputs. Examples of environmental parameters may include a temperature, weather conditions, the time of day, the illumination and/or sounds in the proximity of the interactive play apparatus, the geographic position of the interactive play apparatus and/or the like. Another example of an environmental parameter includes the presence, position, orientation and/or operational state of one or more electronic devices. For example, the processor may receive an indication that there is another electronic device within a proximity. To this end, the play apparatus may include a sensor operable to detect the presence, position, orientation and/or operational state of one or more electronic devices. Examples of such sensors may include a Wi-Fi detector or a Bluetooth receiver operable to detect signal strengths from other Bluetooth devices. For example, such a sensor may be attached to a movable device, e.g. a moving rover, which would thus be able to track signal strength within a room, even without necessarily having to be connected to a Wi-Fi or Bluetooth connection.

In some embodiments, the play action may be indicative of a user-perceptible representation of an output or result of the play experience, e.g. a representation of a behaviour of a game character or another object that is part of the play experience, a representation of a game state, and/or the like. The translation of the play action may thus comprise a transformation of the determined representation into instructions operable to cause one or more of the detected electronic devices to perform a function that at least approximates the user-perceptible representation.

The play actions may result in on or more outputs which a user can perceive, e.g. visually, audibly or as tactile output. In particular, the play actions may represent actions of different actors within a play scenario, e.g. different play characters, objects, or of the environment in which a place scenario takes place.

In some embodiments, the interactive play apparatus does not merely perform a deterministic user-activated control of one or more electronic devices, but adds an element of autonomous behaviour/evolution to the activation of the electronic devices, e.g. by adding autonomous behaviour which may at least partly be based on random or seemingly unpredictable events, or by adding an element of randomness or unpredictability to the transformation of received inputs to play actions and further to specific instructions for controlling the electronic devices. It will be appreciated that the autonomous behaviour may be performed based on a set of rules, such as predetermined rules of the interactive play apparatus. Accordingly, the interactive play apparatus may contribute or add to the play experience, which may result in a surprising and enjoyable experience for the user and/or inspire the user when continuing with the play experience.

In some embodiments, the interactive play apparatus may comprise a library of translation rules which may be predetermined, e.g. downloaded from a host system, and/or custom-made or custom-adapted by, or for, the particular interactive play apparatus, e.g. based on user-feedback, user input, a machine learning process and/or the like. The interactive play apparatus may allow sharing of custom-made or custom-adapted libraries with other interactive play apparatus, e.g. via a social media system, a file sharing system, a computer network and/or the like. Determination of instructions may comprise selecting the instructions from a library of instructions and/or creating the instructions based on a set of translation rules.

The instructions into which the play actions are translated may take a variety of forms, e.g. command messages conforming to a suitable communications protocol, digital and/or analogue control signals, and/or the like. It will be appreciated that the interactive play apparatus may communicate the instructions to one or more of the detected electronic devices via the one or more communications interface so as to cause said one or more of the detected electronic devices to perform the functions.

The communicated instructions may be in different formats and the communication may adhere to different protocols or standards, depending on the respective electronic devices. Accordingly detecting the electronic devices and/or detecting the capabilities of the detected electronic devices may include a detection of communications capabilities, communications protocols and/or the like. It will be appreciated that the form of the instructions may be uniform across different electronic devices or they may vary between electronic devices. In embodiments where the interactive play apparatus is a distributed apparatus comprising multiple individual units, e.g. including one or more of the electronic devices, causing the electronic devices to perform the functions may comprise communicating the instructions from a first unit comprised in the interactive play apparatus to one or more of the electronic devices comprised in the interactive play apparatus. The first unit may be one of the electronic devices or a central control or hub unit. The first unit may perform the step of determining the play actions alone or in cooperation with other units comprised in the interactive play apparatus.

The determination and translation of the play actions and, optionally, the communication of the resulting instructions may be performed concurrently with the receipt of the input, preferably in real-time. The term real-time as used herein refers to a processing where the user can view the effects of the received inputs on electronic devices as the user interacts with the interactive play apparatus, i.e. without a long delay. For example, the delay between receipt of an input and the start of the performance of the resulting functions by the electronic devices may be less than 1 minute, such as less than 30 s such as less than 10 s. In some embodiments, the delay is sufficiently short so as to at least initiate the performance of the functions responsive to one set of one or more received inputs before a subsequent set of received inputs has been completely received. Hence, the user can watch or otherwise experience his/her input actions affecting the environment while the play interaction between the user and the interactive play apparatus evolves. It will be appreciated, however, that the processor may be configured to delay the performance of some or all of the functions by the electronic devices that are associated with a play action, e.g. until a trigger event has occurred, e.g. an external input has been received, until another function has been caused, or until a certain time has elapsed. For example, a determined play action may comprise a sequence of functions but it may require the play apparatus or one of the electronic devices device to detect a change in light (by means of a light sensor) or change in received signal (e.g. the appearance or activation of an electronic device) in order for the sequence of functions to proceed. In one particular example, the play apparatus may detect a person's phone in range (eg. within home Wi-Fi) and trigger off some sound, but only after a certain time of day.

Moreover, experiencing the play experience unfold may inspire the user to continue the play experience. The user may even be triggered to explore how certain inputs are interpreted by the interactive play apparatus and what effects the inputs have on the environment and, in particular on a number of electronic devices.

Generally, examples of electronic devices may include electronic devices that are capable of wired or wireless communication, e.g. via Bluetooth, Wifi and/or another wireless communications technology, e.g. using ultrasound or infrared communication. The interactive play apparatus may be configured to detect electronic devices within a proximity of the interactive play apparatus and/or that are otherwise associated with the interactive play apparatus. More specifically, the detection of electronic devices may include detection of electronic devices within a communications range of at least one component (e.g. a control unit or hub) of the interactive play apparatus. Alternatively or additionally, the detection may include the detection of electronic devices that are otherwise communicatively associated with the interactive play apparatus, e.g. are connected to the same communications network, e.g. are connected to a predetermined wireless and/or wired local area network, or that are communicatively connected to the interactive play apparatus by a wired or wireless connection. In some embodiments the detectable electronic devices include IoT enabled devices. The detection of the electronic devices may be based on a suitable wireless device detection mechanism, e.g. as known from Bluetooth devices, and/or the like.

Examples of electronic devices include electronic toys, such as electronic toy construction elements of a toy construction system, remote controllable toys, such as remote controllable cars, drones, etc., toy robots, intelligent illumination devices or systems, etc.

In some embodiments, the interactive play apparatus is a component of an interactive play system where the interactive play apparatus comprises the interactive play apparatus and a set of one or more electronic devices. For example, the interactive play system may be a toy construction system comprising electronic devices in the form of functional toy construction elements that can perform one or more functions in response to received instructions. The interactive play apparatus may be configured to only detect electronic devices that are part of the interactive play system while, in other embodiments, the interactive play apparatus may be configured to also detect electronic devices that are not part of the interactive play system. In some embodiments, the interactive play apparatus may thus operate as a hub or operating system that can make itself aware of a variety of different types of electronic devices. The types of electronic devices that can be detected and interacted with by embodiments of the interactive play apparatus may be rather heterogenous and do not necessarily have to be limited to electronic toys but may also include other household devices, such as lamps, loudspeakers, music systems, etc. In particular, the interactive play apparatus may be configured to interact with electronic devices that are not per se designed to work with another or even as part of a common system.

In some embodiments, detecting the electronic devices may comprise preliminary detecting a set of electronic devices, and selecting a subset of the preliminary detected electronic devices as detected electronic devices where the selection may be based on a set of selection rules. The selection rules may e.g. include a list of devices that are unsuitable for use with an interactive play apparatus, e.g. for safety reasons, policy reasons, parental control reasons, etc. Alternatively, the selection rules may include a positive list of electronic devices that are permitted to be used with the interactive play apparatus. In such an embodiment, the interactive play apparatus may be configured to only select electronic devices that are included on the positive list. In yet other embodiments, the selection rules may include a list of permitted capabilities and/or a list of excluded capabilities and the selection may be performed after the detection of the capabilities of the preliminary detected electronic devices and based on a comparison of the capabilities of the preliminary detected devices. In some embodiments, the selection may even include an optional partial selection of an electronic device, e.g. where only some of the detected capabilities of said electronic device are to be made available for use with the interactive play apparatus. In some embodiments, the device detection may be based on device profiles or other suitable device detection mechanisms.

The detection of the device capabilities may be based on an initial communication between the interactive play apparatus and a detected electronic device. During such initial communication, the electronic device may be e.g. communicate its device type, or one or more available device profiles of a plurality of operational profiles, a set of available commands and/or the like to the interactive play apparatus, thus allowing the interactive play apparatus to determine a number of functions which the detected electronic device is capable of performing and which commands the electronic device accepts in order to invoke the available functions. In addition to detecting capabilities, the interactive play apparatus may further determine other attributes of the detected electronic devices, e.g. their shape, size, a theme associated with them and/or the like. The detection of these attributes may be performed by communicating the attributes from the electronic device to the interactive play apparatus, by way of a look-up table of attributes of known electronic devices or by another suitable mechanism. For example, the interactive play apparatus may comprise a camera and detect attributes of an electronic device based on an acquired image of the device.

Generally, the capabilities may include functions that can be performed by the electronic devices, such as functions that provide an output that can be perceived by the user, e.g. a visible, audible or tactile output, such as a movement of the entire electronic device or a part thereof, a visual output, such as a light effect, a display, etc. or a sound, voice, music, tune, etc. played by the electronic device. Other examples of functions include functions that acquire an input, such as by a microphone, a light sensor, an accelerometer and/or the like. Accordingly, the capabilities may include an output capability of an electronic device for producing one or more user-perceptible outputs by said electronic device. Alternatively or additionally, the capabilities may include an input capability of an electronic device for acquiring one or more sensor inputs by said electronic device.

An electronic device may have associated with it a set of generic capabilities (e.g. "walk", "drive", "talk", "move", etc.) that may be associated to more than one electronic device, and a set of specific capabilities, that are specific to an individual electronic device, or to a specific class of electronic device (e.g. "put out fire", "spray water like a whale").

Detecting the capabilities of the device may further include a determination of the commands, control signals or other types of instructions that are accepted by the electronic device so as to invoke its respective functions. The capabilities may thus include a list or other representation of available functions and associated instructions for invoking the available functions. The capabilities may be detected as sets of functions and associated instructions; for example, different sets may be identified as different operation profiles or standards to which the electronic device adheres.

In some embodiments, the interactive play apparatus comprises—e.g. has stored thereon—a library of electronic devices, the library having stored therein data records indicative of a plurality of known electronic devices, each data record comprising information of one or more capabilities of the respective electronic device.

The interactive play apparatus may include one or more input devices for receiving inputs from the environment of the play apparatus, from a user, or previously stored inputs. The inputs may be user-created inputs, user-initiated inputs or other inputs indicative of an attribute of the physical environment of the play apparatus. For example, the play apparatus may include one or more input devices for receiving user inputs, e.g. a game controller, a remote control, a joy stick, an input wand, a touch screen, a voice interface, a device for detecting gestures or otherwise movements of the user's body or of parts of the user's body, an input device for detecting eye movements, a camera, and accelerometer, a tilt sensor, etc. or combinations thereof. Examples of input devices for receiving inputs from the environment of the play apparatus include a camera, a motion sensor, a heat sensor, a microphone, a proximity sensor, an RF signal sensor, etc.

In some embodiments, the input device of the interactive play apparatus receives voice and/or other input from multiple users so as to allow a group of users to cooperate in creating a play experience.

In some embodiments, the received input may include recorded audio input and, in particular, a spoken narrative which may be recorded concurrently with the processor controlling the electronic devices. Alternatively, the input may be in a different form, e.g. a written text, or prerecorded. Accordingly, the input device may be a voice recorder, e.g. comprising one or more microphones. Other examples of input devices may include a text input device. Other examples of audio input from the environment of the play apparatus may include user-created or user-initiated sounds, e.g. laughter, clapping, a sound made by an electronic device, etc. In this manner, the play apparatus may e.g. simulate a conversation or other form of interaction between multiple devices.

Alternatively or additionally to receiving a spoken narrative, the received input may include other sensor data indicative of a narrative. In particular, in some embodiments, the received input represents one or more objects within a scene. In some embodiments, the input may represent the evolution of the scene over time. To this end, the input may comprise images, e.g. still images or frames of a video stream, of a scene. For example, the images may include a sequence of images of the scene captured at different points in time. Accordingly, the input device may include a camera, such as a digital camera, a depth camera, a video camera or the like.

The interactive play apparatus may thus be configured to receive the images, analyze each image so as to recognize one or more objects within the image, their locations within the scene and/or their relations with each other. To this end, the interactive play apparatus may implement suitable vision technology processes, e.g. using a trained convolutional neural network, trained to recognize objects in the images.

It will be appreciated that the recognition of objects within a scene may also be performed in other ways, e.g. by receiving radio signals from the objects. In some embodiments, the objects may be configured to detect each other, e.g. by radio communication, near-field communication, electrical signals, etc. One or more of the objects may then communicate information about itself and about other objects within the scene to the interactive play apparatus, including information about at least their relative locations and, optionally, other attributes indicative of the relations or interactions between the objects. Alternative or additional input data representing objects in the scene may include data from detected RFID tags, QR codes and/or the like.

Regardless of the type of input data representing the objects within the scene, the interactive play apparatus may be configured to identify properties, behaviors, interactions and/or relations of the detected objects, e.g. using context-trained Recurrent Neural Networks (RNN) or other similar scene captioning approaches.

Moreover, when the interactive play apparatus receives images of the scene captured at different times, or other input data representing the objects within the scene at different points in times, the interactive play apparatus may extract a sequence (e.g. a time series) of events, each event representing one or more of the following: object presence, object properties, object behaviors, object interactions and/or relations.

In some embodiments, the interactive play apparatus is configured to identify play intent of a user who manipulates the objects within the scene (e.g. positions objects within the scene, repositions objects, adds or removes objects, changes the configurations of the objects, etc.) based on the extracted events. In particular, the interactive play apparatus may determine a sequence of story elements from the sequence of events. The story elements may be expressed as a sentence or other synthactical element or in another suitable data structure descriptive of the detected event. This identification and/or creation of story elements may e.g. be based on suitable event recognition methods such as Recurrent Neural Networks, Long-Short Term Memory (RNN, LSTM) or similar.

Finally, the interactive play apparatus may determine one or more play actions, based on the identified play intent or story element, and control one or more electronic devices so as to implement the play action, e.g. as described below. Play actions may include the playing of sounds or visual effects (light, motion, etc) that are selected based on the identified play intent or story element.

Accordingly, according to one aspect, disclosed herein are embodiments of an interactive play apparatus comprising:
    an input device configured to receive an input,
    one or more communications interfaces,
    one or more processors;
wherein the one or more processors are configured to:
    a) receive one or more inputs via the input device, the input being indicative of a scene, the scene including one or more objects;

b) detect the one or more objects within the scene
c) detect locations of the detected objects and/or relations between the detected objects
d) extract a sequence of events occurring in the scene, each event involving one or more of the detected objects;
e) determine one or more user-perceptible play actions based at least in part on the extracted sequence of events;
f) translate the determined one or more play actions into one or more instructions operable to cause one or more electronic devices to perform one or more functions that at least approximate the determined one or more play actions;
g) cause the one or more of the detected electronic devices to perform said one or more functions.

The interactive play apparatus may further be configured to detect one or more electronic devices and, for each detected electronic device, determine one or more capabilities of said electronic device. The interactive play apparatus may thus translate the play actions into instructions based at least in part on the detected one or more capabilities of the respective detected electronic devices;

In some embodiments, one, or even the primary, way the user interacts with the interactive play apparatus is by telling, or otherwise presenting, a narrative to the interactive play apparatus, i.e. the input may be the recorded voice of the user or another type of input representing the narrative. For example, as described above, the user may manipulate objects, e.g. toys, within a scene so as to play out a narrative. The interactive play apparatus may thus be regarded as implementing a "story master" that transforms the narrative input by the user into actions of electronic devices in the physical environment of the user.

A narrative normally comprises a sequence of story elements; each story element may comprise one or more sentences or other suitable syntactical entities, e.g. snapshots/images of a scene that evolves over time. In some embodiments, translating a narrative received as an input comprises transforming the voice or other input (e.g. a sequence of images) into text or another digital representation of story elements, e.g. a script conforming to a suitable script language, or another suitable data structure, that can serve as an input to a process controlling one or more of the electronic devices.

Accordingly, in some embodiments, the processor is configured to:
transform a first story element of the sequence of story elements into at least a first play action;
determine the instructions based on the first play action and the detected one or more capabilities of the respective detected electronic devices.

In some embodiments, each story element comprises at least one sentence, image, or other syntactic entity, and wherein the processor is configured to transform the first story element based on a context defined by one or more previous story elements of said sequence. For example, the processor may be configured to perform a speech recognition process, including a semantic analysis to identify the literal meaning of a story element and/or an understanding of the contextualised meaning of the story element. In other embodiments, the interactive play apparatus may implement a process for analyzing images of a scene, e.g. implementing an image captioning process to represent the contextualised meaning of an image of a sequence of images.

When the received input includes a narrative the determination of play actions may e.g. be based on a natural language processing system known per se in the art, such as a system based on neural networks or other machine learning technologies, e.g. as known from chat bots. In other embodiments, the process may be based on convolutional neural networks and/or recurrent neural networks trained to analyse images or other representations of scenes.

In some embodiments, controlling the electronic devices may be based on one or more alternative or additional inputs, e.g. on inputs from a game controller, on detected gestures, on one or more captured images or on a recorded video or other types of inputs. The one or more images or video may depict a scene and/or one or more real-world objects and/or gestures by the user. Other examples of user inputs may include tracked eye movements of the user, GPS or other location information, the current time of day, the current season (e.g. winter, summer), a detected mood of the user (e.g. measured by measuring a physiological parameter), the brightness of the room, inputs from a further user, e.g. a remote user, or from another data processing system via a computer or communications network. In some embodiments, a user input may be extracted from a recorded sound, the recorded sound comprising the voice of the user telling a narrative and/or other audio information, e.g. music or other sounds. Generally, the received input may also include previously stored input (e.g. stored in and later retrieved from the cloud or another host on a computer network) and or stored or live mechanical/motion input. Hence, the input device may include a storage device.

In a specific example, the interactive play apparatus may receive one or more captured images or video depicting a scene which may include one or more real-world objects. In some embodiments, some or all of the objects may be controllable by one or more of the electronic devices. The interactive play apparatus may e.g. use the captured image of the scene for detecting capabilities and/or other attributes of the electronic devices when controlling the real-world objects. Alternatively or additionally, the interactive play apparatus system may recognise features of the depicted scene and create play actions responsive to the recognised features. Similarly, the interactive play apparatus may recognise one or more real-world objects in the depicted scene and/or movements or other changes involving the real-world objects, and create play actions responsive to the recognised real-world objects and/or changes, and control behaviour of the detected and/or other electronic devices accordingly. In particular the control of the electronic devices may be performed based on a combination of the received images/video and user inputs such as a received narrative. Alternatively, as described herein, the received images may represent a narrative; hence the received images may be the only input or it may be combined with other inputs.

In some embodiments, the real-world objects may be toys, such as toy construction models assembled from toy construction elements, optionally including functional toy construction elements, e.g. motors, lights, sound devices, that can be detected and controlled by the interactive play apparatus to perform respective functions. When the interactive play apparatus recognises certain toys in a captured image or video, the system can determine their respective capabilities and/or other attributes.

For example, the user may manipulate an electronic toy in front of a camera while telling a story involving the toy. The play apparatus may detect and recognise the electronic toy and control the electronic toy and/or other detected electronic devices responsive to the story told by the user and, optionally, responsive to the detected movements or other manipulations of the real-world toy by the user. Accordingly, the interactive play apparatus may observe the user and/or the user's physical creations in front of a camera and control detected electronic devices accordingly.

It will be appreciated that other embodiments may be implemented without a camera and/or without a detection of electronic devices, capabilities or other attributes based on a captured image. Generally, the interactive play apparatus may detect an electronic device and, optionally its capabilities and/or other attributes, in a variety of ways, e.g. from a captured image, by means of an RFID reader, a barcode reader, a QR code reader, or another code reader operable to detect a corresponding code (e.g. an RFID tag, a barcode, a QR code or the like) associated with the electronic device. Other ways of detecting an electronic device and/or its capabilities may include RF communication between the interactive play apparatus and the electronic device or another suitable communications technology, e.g. NFC communication, communication via a wired/galvanic connection, and/or the like.

When there is an interruption or pause in the inputs, e.g. a narrative, received from the user, the interactive play apparatus may also pause control of the electronic devices. Alternatively the interactive play apparatus may continue to control the electronic devices, e.g. based on predetermined default play scenario, optionally modified based on the inputs received so far. Hence, the physical play environment may continue to evolve even when the user input pauses. The user may thus observe the autonomous evolution of the play environment and use it as an inspiration for a continuation of the play experience. For example, in this way, a storyline may evolve interactively and somewhat autonomously, thus providing unexpected and entertaining effects.

In some embodiments, the processor may be configured to determine at least one object to which the received input—e.g. a narrative—refers, and to determine at least one affordance of the determined object. The determination of the object and/or the affordance may be based at least in part on the received input; optionally, the determination of the object and/or the affordance may at least in part be based on a further input, e.g. one or more captured images. The processor may thus select one or more of the detected electronic devices based at least in part on the determined object. For example, the processor may select an electronic device that has a capability that corresponds to/matches the determined affordance. Selecting may be based on the determined object and, optionally, on the determined affordance. For example, the process may select an electronic device that is consistent with the determined object—e.g. that has one or more attributes in common with the determined object—and that has at least one capability that is consistent with the determined affordance. The determined object may e.g. be an actor associated with a play action, where the play action represents a function/behaviour performed by an actor.

In some embodiments, the interactive play apparatus collects feedback information during the play experience, e.g. by measuring parameters such as the duration of the user session, the frequency and/or lengths of pauses between user inputs, by detecting a mood of the user (e.g. by measuring a physiological parameter, by detecting a mood from a voice input, such as detecting laughter, or the like). Alternatively or additionally, the interactive play apparatus may collect feedback after completion of a play session, e.g. by recording subsequent comments, by allowing the user to activate an emoticon or the like. The collected feedback may then be used as additional input to the determination of play actions and/or instructions in response to subsequently received inputs of the same and/or of a subsequent play session, e.g. by reinforcing certain choices (e.g. certain play actions and/or instructions) and suppressing others. It will be appreciated that the feedback way not necessarily detect "right" and "wrong" interpretations of user inputs but interpretations that amused the user, or that caused the user to continue the interaction for an extended period of time, and/or on other parameters indicative of the reaction of the user on the behaviour of the electronic devices. Accordingly, in some embodiments, the processor is configured to record feedback information indicative of one or more parameters of a user session, the user session comprising receipt of the one or more inputs; and wherein the processor is configured to process a subsequently received input based at least in part on the recorded feedback information.

The interactive play apparatus may be embodied as a suitably programmed computer, comprising a suitable input interface and a suitable communications interface for communicating with electronic devices. The communication interface and the input interface may be integrated into the computer or connectable to the computer as a peripheral.

The interactive play apparatus may also be implemented as a distributed system. For example, the interactive play apparatus may comprise a client terminal and a host system. The client terminal may include the input interface and the communications interface while the host system may comprise a processor configured to perform the determination of capabilities and/or the determination of play actions and/or the translation of play actions into instructions. The host system and the client terminal may be connectable via a suitable computer network or communications network. In a distributed system, multiple client terminals of multiple users may be connectable to a single host system, e.g. in order to cooperatively interact with shared electronic devices.

In another example of a distributed implementation, the interactive play apparatus comprises one or more physically separate units, e.g. including one or more of the electronic devices, where different functions performed by the interactive play apparatus may be performed by respective ones of the separate units. In some embodiments, the electronic devices may perform the translation of the play actions into instructions. For example, a central hub unit of the interactive play apparatus may determine the play actions and communicate representations of the play actions to a number of electronic devices. The electronic devices may determine, based on their respective capabilities, which functions they are able to perform so as to at least approximate the play actions. The electronic devices may return information about the available functions for a particular play action to the hub unit. The hub unit may then select one or more of the functions and communicate instructions to the respective electronic devices so as to cause them to perform the selected functions. In another embodiment, the selection of suitable functions may be performed by the electronic devices in a distributed manner, e.g. based on an arbitration scheme, where the electronic devices exchange information about available functions associated with a determined play action. The exchanged information may include a suitability score for each available function so as to allow the electronic devices to select a suitable function, e.g. a function having a highest suitability score.

Generally, when referring to the interactive play apparatus performing an operation, it will be appreciated that a processor and/or another component/unit of the interactive play apparatus may perform this operation.

Here and in the following the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units.

The interactive play apparatus may include a suitable computer program implementing the various functions of the interactive play apparatus. For example, the computer program may be stored on a suitable storage device of the interactive play apparatus and executable by a processor of the interactive play apparatus, e.g. a suitably programmed microprocessor. The computer program may implement a variety of functional modules of the interactive play apparatus, e.g. including a device detector, a capability detector, a behaviour engine, a story translator, a story listener, and/or the like. It will be appreciated that the functions of the play apparatus may be divided into program modules in different ways. For example, some of the above functional modules may be integrated into a single module while others may be split up into submodules. The interactive play apparatus may further comprise one or more libraries, e.g. chosen from the following libraries: A library of game rules, a library of predetermined play actions, a library of electronic devices and their associated capabilities; a library of associations between user inputs and play actions, a library of associations of play actions and instructions, etc.

The present disclosure relates to different aspects including the interactive play apparatus described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, described herein are embodiments of a computer-implemented method of controlling an interactive play apparatus, the method comprising:
a) detecting one or more electronic devices;
b) for each detected electronic device, determining one or more capabilities of said electronic device;
c) receiving one or more inputs via the input device, e.g. user input, input from an environment of the play apparatus, stored input etc.;
d) determining one or more user-perceptible play actions based at least in part on the received one or more inputs;
e) translating the determined one or more play actions onto one or more instructions operable to cause one or more of the detected electronic devices to perform one or more functions that at least approximate the determined one or more play actions; wherein the translation is based at least in part on the detected one or more capabilities of the respective detected electronic devices;
f) causing the one or more electronic devices to perform the one or more functions.

According to another aspect, a computer-implemented method of controlling an interactive play apparatus comprises:

a) detecting one or more electronic devices;
b) for each detected electronic device, determining one or more capabilities of said electronic device;
c) receiving one or more inputs via the input device; the input being indicative of a scene, the scene including one or more objects;
d) detecting the one or more objects within the scene
e) detecting locations of the detected objects and/or relations between the detected objects
f) extracting a sequence of events occurring in the scene, each event involving one or more of the detected objects;
g) determining one or more user-perceptible play actions based at least in part on the extracted sequence of events;
h) translating the determined one or more play actions onto one or more instructions operable to cause one or more electronic devices to perform one or more functions that at least approximate the determined one or more play actions;
i) causing the one or more electronic devices to perform the one or more functions.

According to one aspect, a data processing system is configured to perform the steps of an embodiment of one of the methods disclosed herein. In particular, the data processing system may have stored thereon a computer program, the computer program comprising computer-executable instructions which, when executed by the data processing system, cause the data processing system to perform an embodiment of a process described herein.

According to yet another aspect, a computer-readable medium has stored thereon instructions which, when executed by one or more processing units, cause the processing unit to perform an embodiment of the process described herein. The computer program comprises program code adapted to cause, when executed by a processing device, the processing device to perform one or more of the methods described herein. The computer program may be embodied as a computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store.

Additional features and advantages will be made apparent from the following detailed description of embodiments that proceeds with reference to the accompanying drawings.

BRIEF DESCRIPTION OF THE DRAWINGS

Preferred embodiments of the invention will be described in more detail in connection with the appended drawings, where.

DETAILED DESCRIPTION

Figure 1:
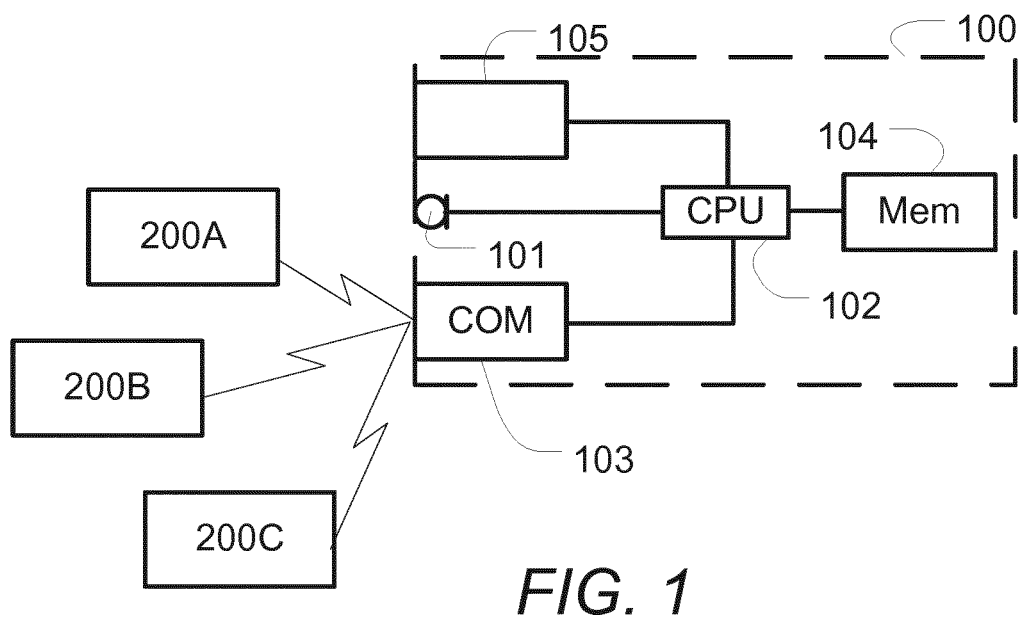
FIG. 1 shows a schematic block diagram of an example of an interactive play apparatus.

FIG. 1 shows a schematic block diagram of an example of an interactive play apparatus, generally designated by reference numeral 100.

The interactive play apparatus 100 comprises an input device 101. The interactive play apparatus further comprises a processing unit 102, a communications interface 103, a memory 104 or other suitable data storage device, and a sensor 105.

It will be appreciated that other embodiments of an interactive play apparatus may include more than one input device and/or more than one processing unit and/or more than one communications interface. It will further be appreciated that alternative embodiments of an interactive play apparatus may comprise a different number of sensors, such as no sensor or more than one sensor. Similarly, some interactive play apparatus may not comprise any separate data storage device or it may comprise multiple data storage devices; for example, the processing unit and/or rendering device may include internal memory or the play apparatus may have access to an external data storage device, e.g. via a computer network.

The input device 101 may comprise a keyboard, a mouse, a touch screen, a game controller, a wand, a camera, and/or the like. In some embodiments the input device comprises a microphone, e.g. a microphone configured to record an audio signal indicative of the user's voice and, optionally, of other sounds. In some embodiments, the input device may receive other forms of input (e.g. sound, light, signals, etc) from the environment of the play apparatus.

The input device is connected to the processing unit 102 and configured to forward the received inputs, e.g. an audio signal indicative of a recorded audio signal, a video signal and/or the like to the processing unit. To this end, the input device may comprise circuitry to process a received input, e.g. by filtering, attenuation, amplification, analog-to-digital conversion and/or the like, and to forward a processed input. Alternatively, the input device may be connected to the processing unit via a suitable signal processing unit that performs some or all of the above signal processing. In some embodiments, the processing unit 102 comprises at least some signal processing capabilities.

The processing unit 102 may be a suitably programmed microprocessor such as a CPU of a suitably programmed computer. In alternative embodiments, the processing unit may be embodied as an ASIC or other suitable processing circuitry. The processing unit receives the received input, e.g. user input, from the input device 101 and processes the received input so as to determine a play action from at least the received input. The processing unit may further translate the play action into instructions to electronic devices 200A-C. Embodiments of the process performed by the processing unit will be described in more detail below.

To this end, the processing unit 102 is coupled to the memory 104 or other suitable data storage device. The memory may have stored thereon play rules, data associated with known electronic devices, etc. The memory 104 may further have stored thereon other relevant information, data (e.g. user-created content), one or more parameters and/or attributes, one or more programs to carry out the functionality as disclosed herein, and/or the like.

The communications interface 103 may comprise one or more devices or circuitry configured to communicate with one or more electronic devices 200A-C as described herein. The communications interface may be configured to facilitate wired and/or wireless communications via one or more suitable communications protocols and technologies, such as Bluetooth, another form of radio-frequency communications, e.g. a wireless local area network, or via other wireless technologies such as infrared-based communications, ultrasound-based communication, etc.

In some embodiments, the interactive play apparatus controls the electronic devices based only on received user inputs while, in other embodiments, the interactive play apparatus controls the electronic devices based on received user inputs and based on further received environmental inputs. For example, the interactive play apparatus may comprise one or more environmental sensors 105, such as a camera or other image capture device, a GPS sensor, a depth camera, and/or the like. The environmental sensor(s) may be responsive to one or more sensor inputs representative of one or more aspects and/or features of the physical environment in a proximity of the interactive play apparatus and/or in a proximity of the user. Each sensor 105 is adapted to forward a sensor signal to the processing unit 102, corresponding to, or representing, the sensor input as obtained or provided by the respective sensor 105. Alternatively or additionally, the processing device may receive one or more sensor signals from one or more of the detected electronic devices via the communications interface 103.

Accordingly, in some embodiments, the processing unit 102 is configured to control the electronic devices in response to a received sensor signal from the environmental sensor(s) 105. The play experience may thus be specifically adapted on the basis of, or influenced by, what a sensor 105 senses or detects in the physical environment.

It will be appreciated that some embodiments of the interactive play apparatus 100 may comprise additional or alternative components, such as further interfaces, displays, output devices, etc.

The different blocks of FIG. 1 may be implemented in respective different physical devices or, alternatively, some or all of them may be implemented in a single physical device. The shown connections may be wired connections, wireless connections or a mix thereof.

Figure 2:
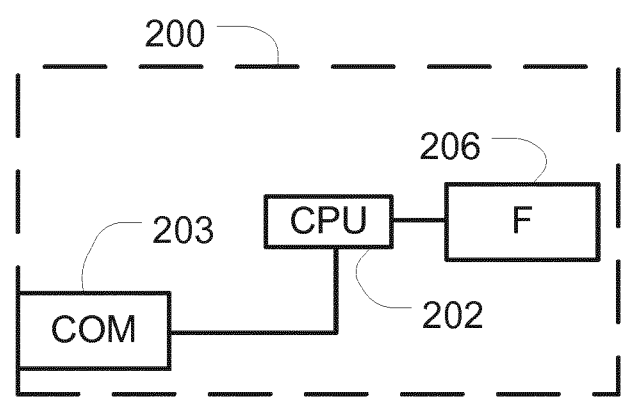
FIG. 2 shows a schematic block diagram of an example of an electronic device.

FIG. 2 shows a schematic block diagram of an example of an electronic device, generally designated 200 for use with, or even comprised in, an interactive play apparatus as described herein.

The electronic device 200 comprises a processing unit 202, a communications interface 203, and a function device 206.

It will be appreciated that other embodiments of an electronic device may include alternative or additional components, such as a input device, a sensor, a memory, etc. It will further be appreciated that alternative embodiments of an electronic device may comprise a different number of processing units, communications interfaces and/or function devices.

The processing unit 202 may be a suitably programmed microprocessor such as a CPU of a suitably programmed computer. In alternative embodiments, the processing unit may be embodied as an ASIC or other suitable processing circuitry. The processing unit is connected to the communications interface 203 so as to allow the processing unit to receive data from—or exchange data with—an interactive play apparatus or a part thereof. The processing unit 202 is further connected to the function device 206 so as to control and/or receive signals from the function device 206. For example, the function device 206 may comprise an actuator or other output device operable to perform a user perceptible function. The processing unit may then be configured to control the function device to perform a corresponding function responsive to the receipt of corresponding instructions via the communications interface. Alternatively, the processing unit may be configured to receive information identifying a play action via the communications interface 203, process the received information to identify a function that is performable by the function device 206 and that at least approximates a representation of the play action. The processing unit may then forward instructions to the function devices so as to cause the function device to perform the identified function. Examples of function devices may include a motor, a light source, an audio source, a vibrator, a linear actuator, etc.

Other examples of function devices may include a sensor or other input device, such as a light sensor, a proximity sensor, a microphone, an accelerometer, a tilt sensor, etc. The processing unit may receive an input signal from the sensor or other input device. In some embodiments, the processing unit forwards the input signal, or a processed input signal, via the communications interface to an interactive play apparatus, to another electronic device and/or to another part of an interactive play apparatus. When the electronic device comprises both an output and an input device, the processing unit may control the output device at least in part responsive to a received input signal.

The communications interface 203 may comprise one or more devices or circuitry configured to communicate with one or more other electronic devices, with an interactive play apparatus or a part thereof. The communications interface may be configured to facilitate wired and/or wireless communications via one or more suitable communications protocols and technologies, such as Bluetooth, another form of radio-frequency communications, e.g. a wireless local area network, or via other wireless technologies such as infrared-based communications; ultrasound-based communication, etc.

The different blocks of FIG. 2 may be implemented in respective different physical devices or, alternatively, some or all of them may be implemented in a single physical device. The shown connections may be wired connections, wireless connections or a mix thereof.

Figure 3:
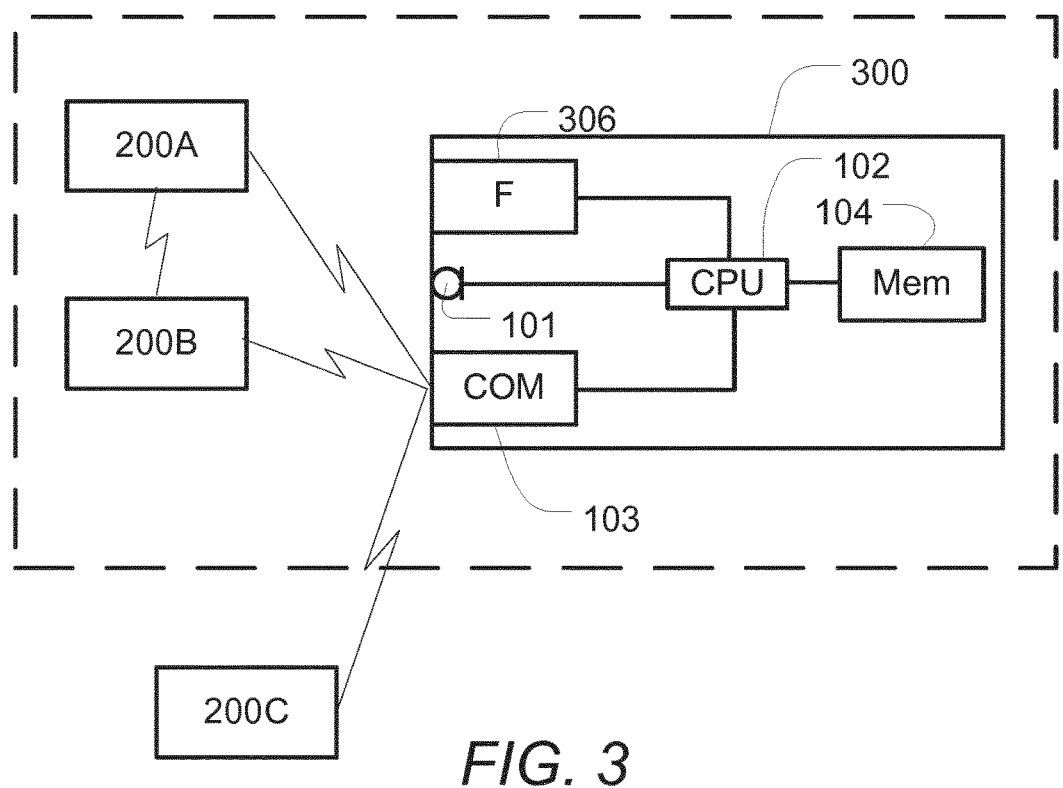
FIG. 3 shows a schematic view of another example of an interactive play apparatus.

FIG. 3 shows a schematic view of another example of an interactive play apparatus. In particular, FIG. 3 illustrates an example of an interactive play apparatus 100 that is implemented as a distributed apparatus which comprises multiple separate units 300, 200A, 200B. In this example, the interactive play apparatus 100 comprises a hub unit 300 and two separate electronic devices 200A and 200B. In this example, the hub unit 300 comprises an input device 101, a processing unit 102, and a communications interface device 103 and a memory 104, all as described in connection with FIG. 1. Optionally, the hub unit 300 further comprises a function device 306, e.g. a function device as described in connection with the electronic device of FIG. 2. The electronic devices 200A and 200B may be electronic devices as described in connection with FIG. 2. In this example, the hub unit 300 and the electronic devices are all configured to communicate with each other via their respective communications interfaces. Accordingly, the functions of the interactive play apparatus may be distributed among the separate units in a variety of ways. In the example of FIG. 3, the hub unit may detect the presence of the electronic devices 200A-B. The hub unit may further receive the received inputs and determine play actions responsive thereto. The hub unit may communicate information about the determined play actions to the electronic devices 200A-B; the hub unit and the electronic devices may then determine appropriate instructions to the respective function devices, e.g. based on a suitable arbitration procedure. It will be appreciated that, alternatively or additionally to the input device 101 of the hub unit 203, one or both of the electronic devices 200A-B may include an input device and communicate information of received inputs to the hub unit 203 and/or to the other electronic device.

It will be appreciated that the hub unit 203 may further detect the presence of other electronic devices 200C that are not able to participate in such an arbitration process, e.g. because they may not be capable of analysing play actions so as to determine suitable instructions. Accordingly, the hub unit 203 may detect the capabilities of the electronic device 200C and determine instructions for the electronic device and communicate the determined instructions to the electronic device 200C.

Figure 4:
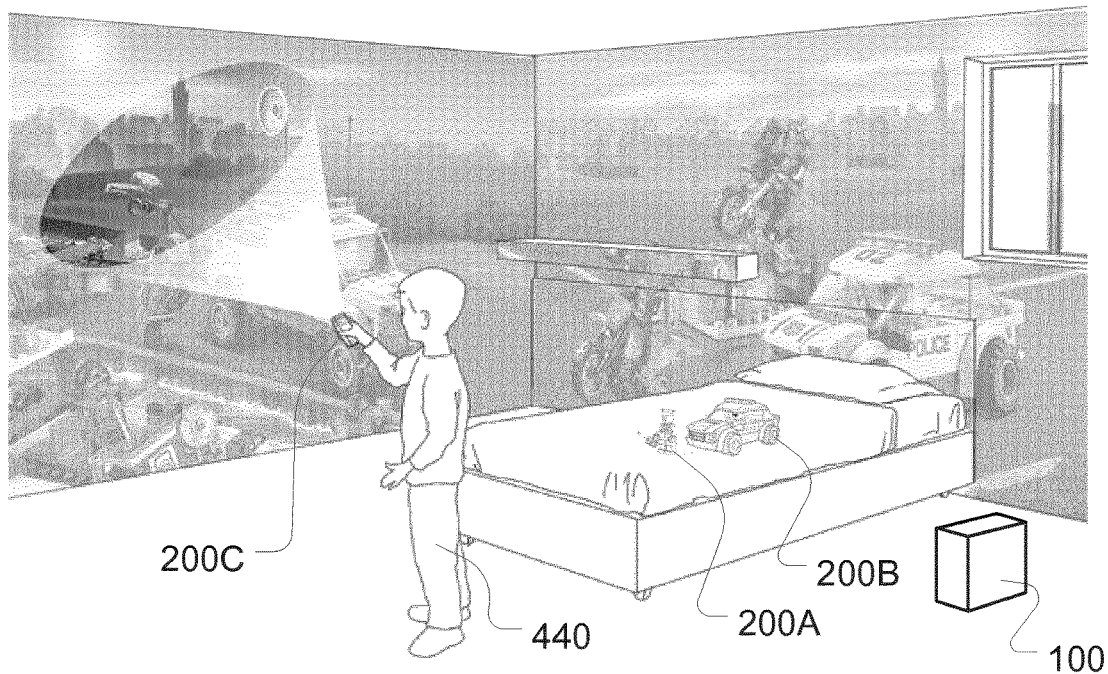
FIG. 4 illustrates a use of an example of an interactive play apparatus.

FIG. 4 illustrates a use of an example of an interactive play apparatus 100 and of electronic devices 200A-C. In the example of FIG. 4, the interactive play apparatus 100 may be embodied as a suitably programmed computer such as a tablet computer, a desktop computer, or the like. The interactive play apparatus 100 may e.g. be of the type described in connection with FIG. 1. The electronic device 200A may have the form of a toy robot, e.g. resembling a knight, comprising motors/actuators to cause the toy robot to move and light sources and/or sound sources so as to create visible and/or audible effects. Electronic device 200B is a remote controllable vehicle that comprises motors to propel and steer the vehicle. Electronic device 200C is a handheld projector controllable to project images or other visual effects onto a surface such as a wall. Nevertheless, it will be appreciated that the play system may comprise alternative or additional electronic devices with alternative or additional capabilities. The interactive play apparatus 100 is configured to detect the presence of the electronic devices 200A-C and to detect their capabilities. The interactive play apparatus 100 or one of the electronic devices comprises a microphone. In this embodiment, the interactive play apparatus is configured to record a narrative told by user 440 into the microphone, to process the narrative and to control the electronic devices 200A-C based on the content of the narrative.

One or more additional sensors of the interactive play apparatus 100 or of the electronic devices 200A-C may obtain further sensor inputs representing one or more aspects and/or features of the physical environment, e.g. in order to detect and optionally recognise physical objects. The microphone signal and, optionally, further sensor signals are then processed by the interactive play apparatus. According to this example, the interactive play apparatus 100 detects the electronic devices 200A-C and their respective capabilities e.g. based on a radio-frequency communication e.g. using Bluetooth, or by another suitable device detection mechanism, e.g. using visible markers, RFID tags, electric connections, etc. In this way, respective identifiers may be communicated from the electronic devices to the interactive play apparatus 100 which may look up the identifier in a database or similar to determine the capabilities of the identified electronic devices. The database structure may link each known electronic device with one or more associated attributes which may be used by the interactive play apparatus to select the electronic device to perform certain functions associated with the recorded narrative. As an example, the database may associate an attribute "knight" to the electronic device 200A. Alternative or additional attributes assigned to the robot may include a "figure" attribute (e.g. as being different to a "vehicle" attribute), a size attribute, attributes indicative of the movement capabilities of the electronic device and/or of other attributes, capabilities, affordances, behaviours, etc.

The interactive play apparatus then determines play actions based on the received narrative and sensor signals. For example, upon receipt of a sentence "The knight follows the car", the interactive play apparatus may determine a play action involving a knight object following a car object. The interactive play apparatus may further determine, based on the information in the database about the detected devices 200A-C that the electronic device 200A is the most appropriate device to represent the knight object and the electronic device 200B is the most appropriate device to represent the car object. The interactive play apparatus may further determine instructions to the electronic device 200A to drive around along a path defined by the instructions, and instructions to the electronic device 200B to move about a corresponding path. The interactive play apparatus then communicates the instructions to the respective electronic devices.

In some embodiments, this cycle is repeated, i.e. the sensor may ongoingly or intermittently provide updated sensor signals (representing potential changes within the physical environment) and the microphone may ongoingly record the user's narrative. The interactive play apparatus may then determine and communicate corresponding instructions to the respective electronic devices.

Figure 5:
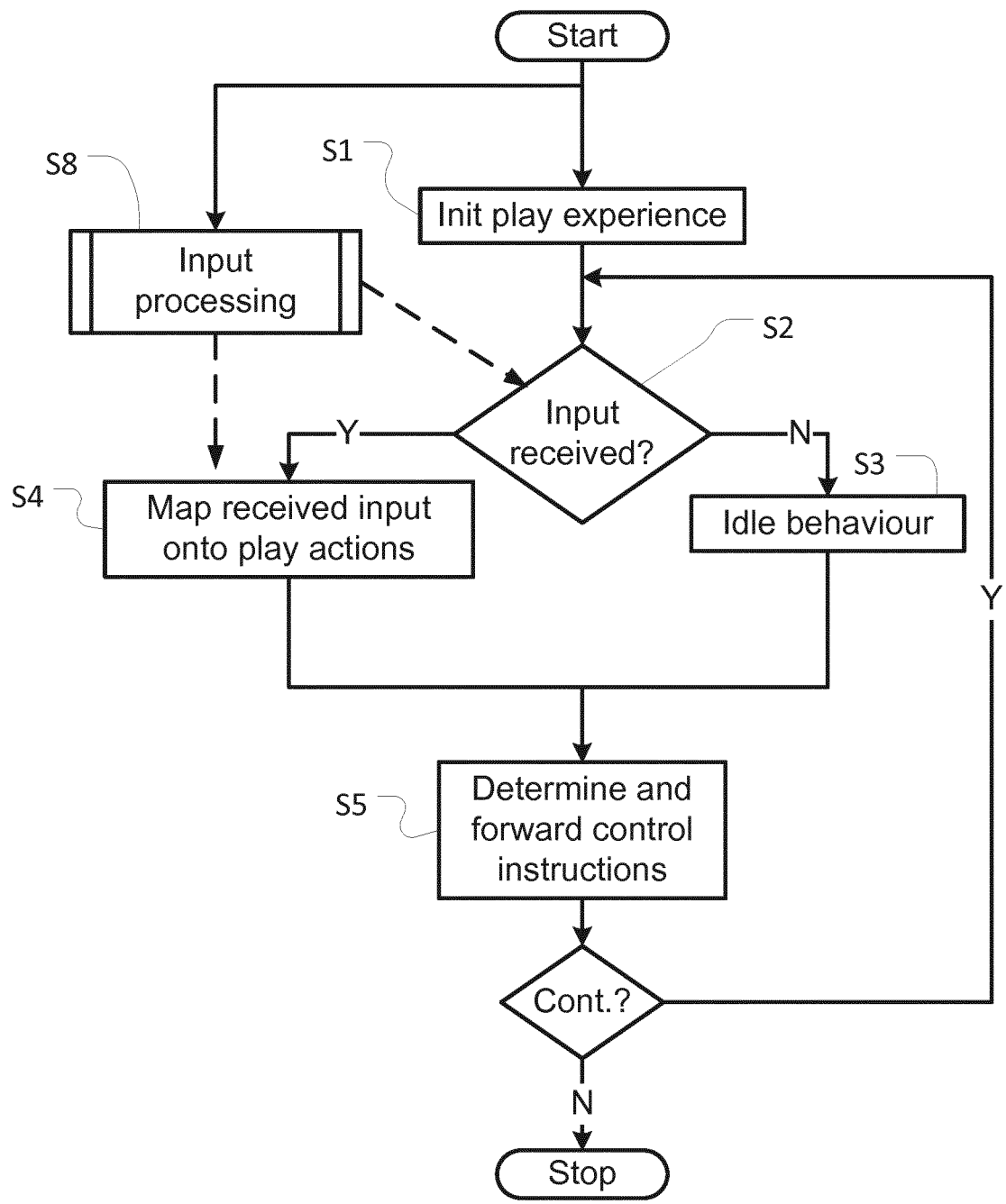
FIG. 5 shows a schematic flow diagram of an example of a process for controlling an interactive play apparatus.

FIG. 5 shows a schematic flow diagram of an example of a process for controlling an interactive play apparatus as described herein based on a received inputs such as a recorded narrative. The process may be performed by the interactive play apparatus of any of FIGS. 1, 3A-B and 4.

In an initial step S1, the process initialises the play experience. The initialisation typically includes initialising suitable data structures representing aspects of the play experience. In particular, the initialisation may comprise the detection of available electronic devices which the interactive play apparatus may communicate with, including the determination of their respective capabilities and, optionally, other attributes. In some embodiments, the initialisation also includes the creation of a play context, e.g. a retrieval of a set of play rules, the definition of a play theme, the definition of a physical space to which the play experience is restricted, and/or the like. The choice of some of associated parameters and aspects of the play experience may be predetermined, selected randomly, based on a user selection, based on the detected electronic devices, or the like. It will be appreciated that, in some embodiments, the detection of electronic devices and/or the determination of other aspects of the play experience may be repeated or otherwise updated dynamically during the course of the play experience.

In subsequent step S2, the process determines whether an input, such as a user input, e.g. a story element of a narrative, has been received. The inputs may be received directly form an input device or from a concurrent input processing process S8. For example, when the input includes a recorded narrative, a concurrent audio processing process, also referred to as a story listener, may receive the audio signal from the microphone and perform initial signal and natural language processing so as to transform the received audio signal into a sequence of story elements, e.g. sentences or other syntactical structures. If no input has been received, the process proceeds at step S3; otherwise the process proceeds at step S4.

At step S3, the process controls the electronic devices according to an idle behaviour of the electronic devices currently included in the play experience. Hence, when the user is silent or otherwise passive, the play experience may continue to evolve to some extent. The idle behaviour may be a predetermined behaviour associated with each electronic device. Alternatively, the idle behaviour may at least to some extent be based on a random factor, e.g. a random selection of one multiple alternative idle behaviours. In some embodiments, the idle behaviour of an electronic device may depend on game events or other events associated with the play experience, such as a proximity to other electronic devices, the type of other electronic devices present, and/or other aspects of the physical environment, e.g. a time of day, time of year, etc. It will be appreciated that, in some embodiments, instead of an idle behaviour, the play experience may simply stop/pause, i.e. in some embodiments the play experience does not evolve during a pause in the inputs. In any event, the process proceeds at step S5.

At step S4, the process analyses the received input so as to determine play actions responsive to the received input. A play action may be defined by an object and a function/behaviour performed by the object. The object may be referred to as an actor. For example, when the input is a spoken story element like "The knight follows the car", the process may determine two play actions: A first play action may have an object representing the car as an actor and a movement as a behaviour, while a second play action may have an object representing a knight as an actor and a movement correlated to the movement of the car entity as a behaviour. The process then determines which electronic devices may represent which objects/actors and how they can represent the associated behaviour. For example, this determination may be based on the attributes and known capabilities of the detected electronic devices.

In some embodiments, if the received input includes a narrative, the process may process a received story element and map the story element onto actions of some or all of the available electronic devices. Hence, in this step the process identifies which objects and associated behaviours a story element refers and which electronic devices may represent the respective objects and how they may represent the associated behaviour. The process may thus identify one or more of the electronic devices and a behaviour/function of the identified electronic devices. An example of the mapping process will be described in more detail with reference to FIG. 6.

In subsequent step S5, the process determines how the electronic devices should be controlled in order to perform the determined behaviour function at least in a approximate way, i.e. the process determines specific control instructions to the respective electronic devices. A play action may involve one, some or even all electronic devices. The other electronic devices that are not affected by the current play action may be controlled according to their respective idle behaviour, as described above in connection with step S3, or based on a behaviour determined based on a previous input.

The process further transmits the determined control instructions to the respective electronic devices. The process then stops or returns to step S2 to check whether another input has been received.

Figure 6:
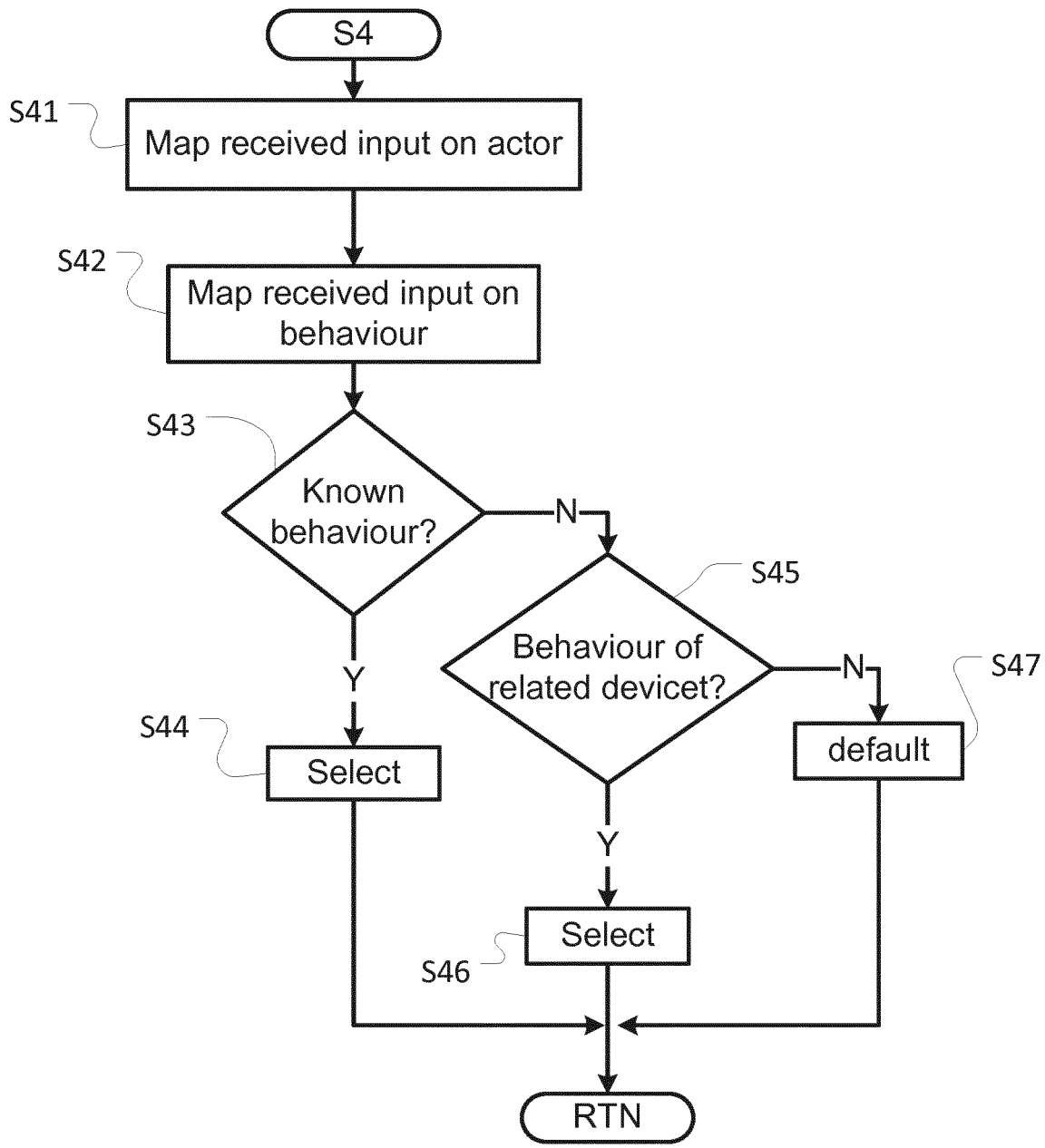
FIG. 6 shows a schematic flow diagram of an example of a sub-process of the process of FIG. 5.

FIG. 6 shows a schematic flow diagram of an example of the sub-process of step S4 of the process of FIG. 5.

In initial step S41 of this sub-process, the process identifies which object a received input refers to. For example, if the received input is a story element that is part of a narrative, the process may perform a suitable natural language processing technique for identifying the objects referred to in the story element. In some embodiments, this step is based on an artificial intelligent engine or a neural network, etc. This step may itself include several subtasks such as one or more of the following: speech/word segmentation, speech recognition, topic segmentation and recognition, word sense disambiguation, etc. The step results in an intermediate representation of the story element suitable for further processing, e.g. based on analysis of the nouns of the spoken text, the literal meaning, their meaning in the specific context etc. The identification may utilise a list of objects that have previously been referred to in the narrative, that are related to a theme associated with a play experience and/or that are associated with one or more of the detected electronic devices. The process may select a most likely object, e.g. based on a suitable cost function indicative of likelihoods that a story element refers to the respective object. For example, the cost function may favour objects that have previously been referred to during the narrative or objects that match one or more attributes of one of the detected electronic devices. Also, the process may determine affordances of the object to be selected, e.g. based on the recognised text, and base the selection on the detected electronic devices and their capabilities. Accordingly, an object that has one or more behaviours associated with it that are compatible with the determined capabilities of one or more of the detected electronic devices may be assigned a higher likelihood than objects that do not have any such compatible behaviours associated with them. For example, if a story element was recognised as "The dragon flies away", the process may assign a high likelihood score (i.e. a low cost) to an object that may be associated with an electronic device that has a "dragon" attribute associated with it. Among those objects, an object associated with an electronic device that has an associated behaviour/capability "fly" (e.g. a toy drone) will receive a further reduced cost. If the process has previously identified an object labelled dragon and if this dragon has a behaviour "fly" associated with it, the process will with a high likelihood select the already present dragon. On the other hand, if the virtual world already includes a dragon which, however, does not have an attribute "fly" associated with it, the process may replace the dragon with another dragon.

Figure 7:
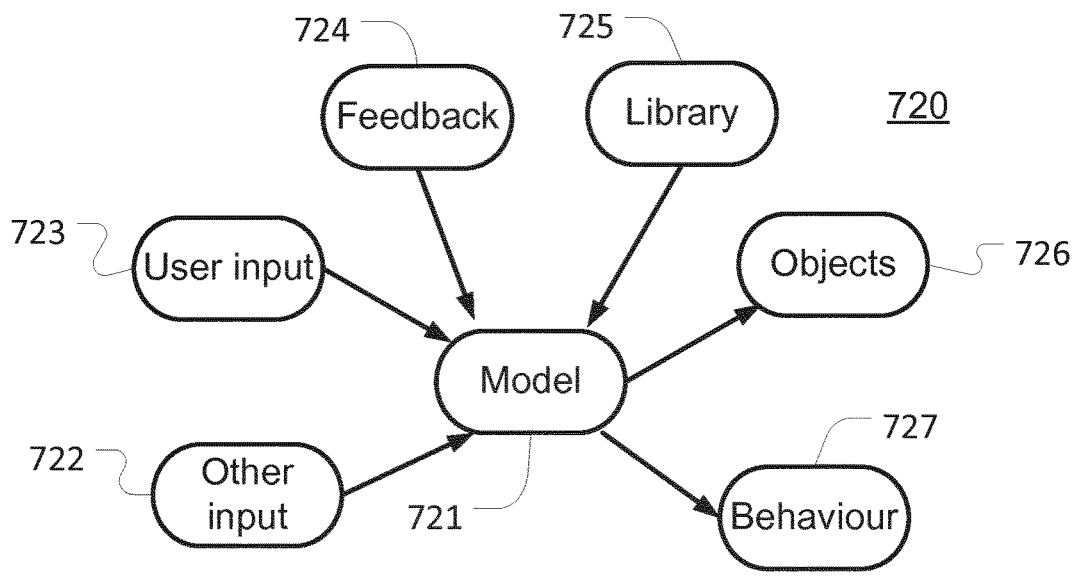
FIG. 7 schematically illustrates an example of a behaviour inference system.

At step S42, the process identifies behaviours of the identified objects. Again, in the example of an input in the form of a story element, this step may be based on an analysis of verbs (such as walk, talk, fly, etc.), adjectives that may represent a behaviour (such as angry, happy), adverbs, etc. in the story element. The behaviours are associated with one or more of the identified objects. The identification of the objects and/or behaviours may be based on a suitable behaviour inference system, e.g. as illustrated in FIG. 7. In order to represent the identified behaviour, at subsequent step S43, the process initially attempts to map the identified behaviour onto a known behaviour/capability of an electronic device that may be associated with the corresponding object to which the behaviour relates. To this end, each electronic device may have associated with it a plurality of known behaviours they are capable of representing, or with other types of capabilities; some behaviours may be defined as specific behaviours of a particular object, while other behaviours may be defined for classes of objects. Generally, the system may comprise behaviours of various degrees of complexity: At a low level, an electronic device may have some basic capabilities, such as predetermined movements, sounds, visual effects, etc. Some electronic devices may also have associated functionalities, such as raising the ladder of a toy fire truck. At a higher level, an electronic device may have more complex behaviours, e.g. collecting items in a room, putting out a fire, creating an illumination or sounds representing a certain mood, etc. These complex behaviours may be defined as combinations and/or sequences of more basic behaviours and/or functionalities. It will be appreciated that steps 41 and 42 may be combined into a single step.

If an electronic device has the identified behaviour associated with it, the process proceeds at step S44 to select that behaviour and returns to the main process (i.e. proceeds at step S5 of FIG. 5).

If, in step S43, the process did not identify any of the known behaviours of an electronic device as a matching behaviour/capability, the process proceeds at step S45 and attempts to identify a matching behaviour/capability of another one of the detected electronic devices or of a combination of capabilities of multiple electronic devices, e.g. another electronic device having a number of attributes in common with the identified object. For example, the process may look for electronic devices that are associated with attributes which have a small distance (measured according to a suitable distance measure) to the attributes of the currently identified electronic device in a suitable taxonomy. Alternatively, if the behaviour is related to a movement of an actor, the process may search for electronic devices that have the capability of performing that type of movement.

If the process detects such a related electronic device, the process proceeds at step S46 and selects the other electronic device instead of the originally selected electronic device before returning to the main process.

If, at step S45, no suitable behaviour can be found, the process may revert to a default behaviour or a randomly selected behaviour (step S47), or the process may select a behaviour similar to the identified behaviour instead. The process then returns to the main process.

FIG. 7 schematically illustrates an example of a behaviour inference system, generally designated by reference numeral 720, for selecting a behaviour based on a story element or other type of received input. The behaviour inference system is based on a suitable behaviour inference model 721 which may e.g. be implemented by an artificial intelligence engine, a neural network, a machine learning process, a hierarchical decision tree, or the like. A very simple type of model may be based on a look-up-table, e.g. implementing a thesaurus or taxonomy. The primary input to the model is the currently received input 723, e.g. a story element or an intermediate representation obtained from the speech recognition step described above. In some embodiments, the model further receives a number of earlier inputs. For example, the model may receive a sliding window of inputs where the window may have a fixed or variable length.

The output of the model includes identified objects 726. The model further outputs behaviours 727 of the identified objects, i.e. the behaviours that are currently to be represented by the electronic devices that represent the objects.

In addition to the received input 723, the model retrieves information from a library 725 of objects and/or electronic devices that represent the objects, their associated capabilities. Accordingly, the model can select appropriate objects, and behaviours from a library of known objects and behaviours.

The model may receive alternative or further information 722, e.g. about the physical environment, about input from a remote user, from a virtual world, etc., as these may also influence the behaviour selected by the model 721. The alternative or further input may be received as individual inputs or as an input stream that is received (and preferably processed) concurrently or alternative to the receipt and processing of user inputs. The input from the physical environment may e.g. include information about the detected electronic devices currently present in the physical environment, optionally their positions and the behaviours/functions currently performed by them, state variables descriptive of the current state of the play experience, etc. Hence, the model can determine how to control the electronic devices based on the user input and/or based on the current context of the play experience and physical environment. The information about the physical environment may be in the form of sensor signals received from additional sensors, or pre-processed versions thereof.

For example, the interactive play apparatus may include a camera which captures images of the physical environment. The interactive play apparatus may process the captured images to detect and recognise real-world objects, e.g. the detected electronic devices. The model 721 may then map the recognised objects to corresponding objects and their behaviours. For example, the library 725 may include a number of different objects having an attribute "dragon" associated with them, each having different capabilities and associated behaviours. Some dragons may have wings and can fly while others cannot. When the process recognises a particular real-world dragon in a captured image (e.g. one having wings), the model may select a matching object (one having wings), thus reducing ambiguities when the user's narrative or other user input refers to "the dragon". Similarly, the process may detect movements of the real-world objects and/or of the user (e.g. gestures) in the captured images and relate the detected movements with the content of the narrative or other user input. The user may thus create input to the system, e.g. by a spoken narrative, and, at the same time, by acting out part of the story.

The model may further receive feedback 724 indicative of one or more performance criteria of the play experience. The feedback may be explicit feedback by the user, e.g. in the form of "like", "dislike", "scary", "funny" selections that the user may provide at the end of a or during the play experience. Other forms of feedback may be more indirect, e.g. by detecting the user's mimics or gestures in captured images, or by detecting features of the user's voice, or by detecting certain user-created sounds, such as laughter, etc. The feedback may thus be used to reinforce certain selections of the model while suppressing others.

Other possible inputs to the model may include a system configuration, e.g. implementing restrictions imposed by a parent user.

Figure 8:
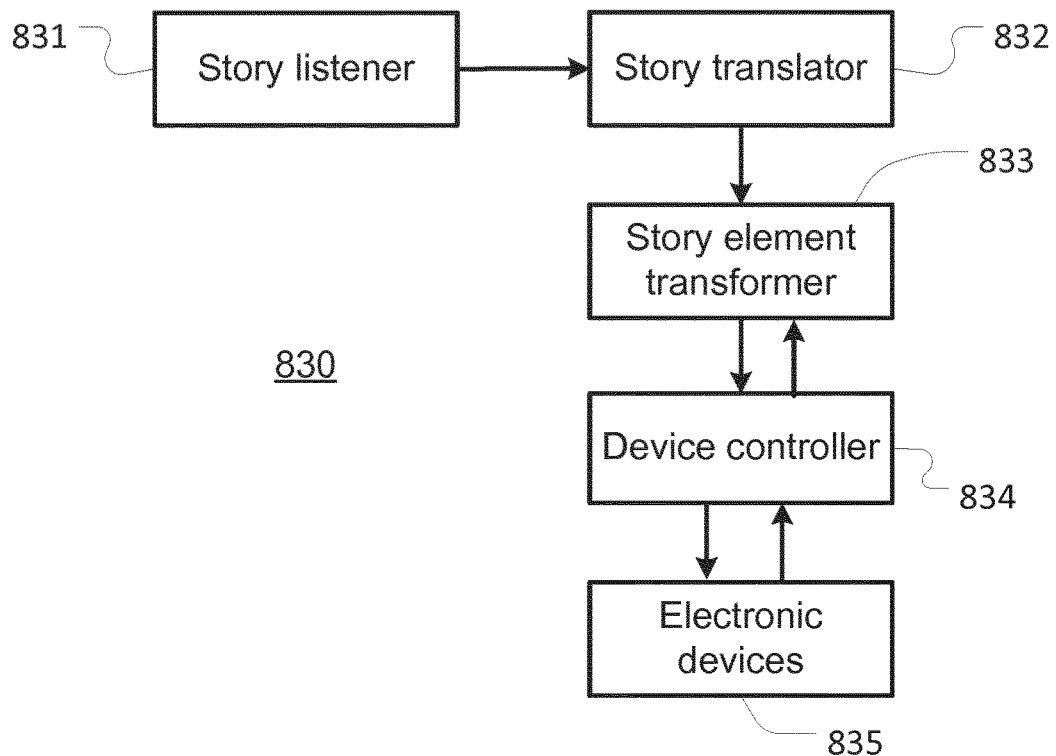
FIG. 8 schematically illustrates functional components of an interactive play apparatus.

FIG. 8 schematically illustrates functional components of an interactive play apparatus, generally designated by reference numeral 830, that is configured to receive a narrative as an input. The functional components may be implemented by software modules executed by one or more processing units of the interactive play apparatus, and they may perform the process described in connection with FIG. 5. Some or all of the functional modules may be executed concurrently and feed their respective outputs into other processes. This may be useful in order to allow real-time processing of an input stream of audio signals that represent a sequence of story elements (e.g. sentences). It will be appreciated, however, that a different structure of the process may be implemented instead.

The system 830 comprises a story listener module 831 which receives the audio signal and performs the initial stages of the speech recognition, e.g. background noise suppression, acoustic and phonetic processing, speech parsing, word recognition, syntax analysis, etc. The story listener may create a sequence of story elements. The output of the story listener is fed into the story translator 832 which may perform the higher level speech recognition tasks, such as semantic analysis to identify the literal meaning of the story elements or an understanding of the contextualised meaning of the story elements. The story translator feeds the processed story elements into the story element transformer 833 which performs the mapping of story elements onto objects and behaviours, e.g. as described in connection with FIGS. 6 and 7. It will be appreciated that, in some embodiments, the story listener and the story translator may operate in passes, e.g. when the story translator sends feedback to the story listener, based on which the story listener forwards an updated story element. Similar feedback loops may also be implemented between other modules of the system.

The story element transformer feeds its output (e.g. the identified objects, their attributes and behaviours or a script or other suitable data structure), to the device controller 834. The device controller 834 updates the data structures representing the detected electronic devices 835, i.e. the data structures representing the current operational states of the electronic devices. The device controller and the story element transformer retrieve the current state of the electronic devices as a further input to their respective processing. Finally, the device controller 834 controls the operation of the electronic devices e.g. by transmitting respective instructions to them.

Figure 9:
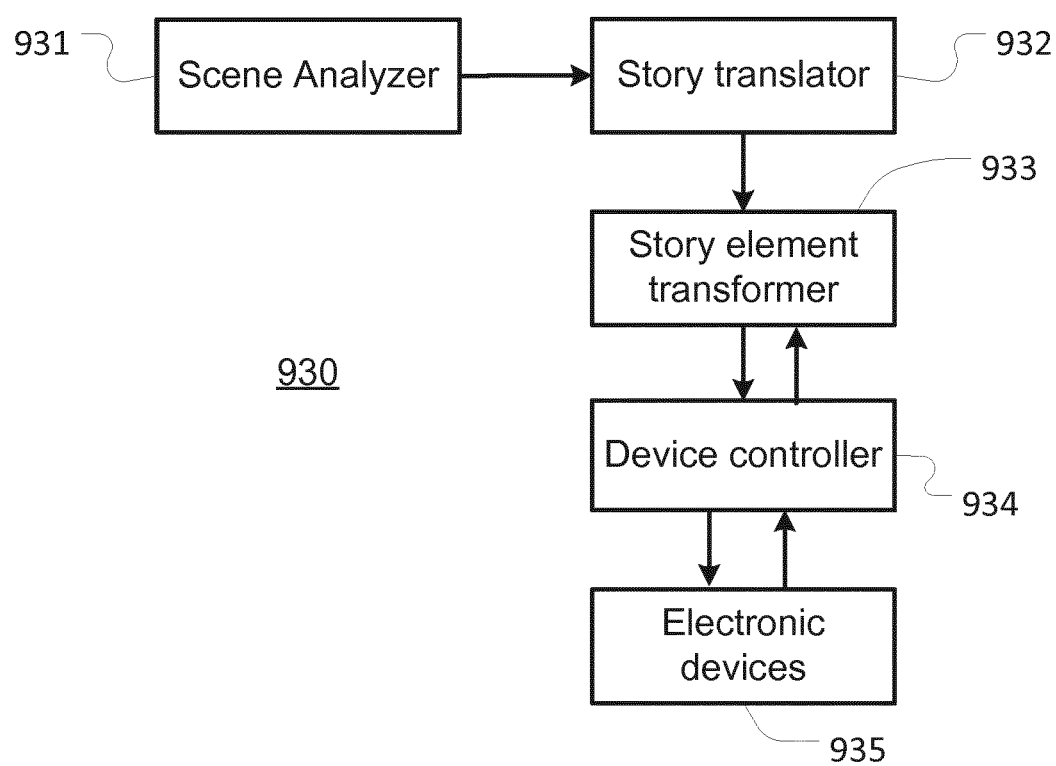
FIG. 9 schematically illustrates functional components of another example of a interactive play apparatus, generally designated by reference numeral 930, that is configured to receive a narrative as an input.

FIG. 9 schematically illustrates functional components of another example of a interactive play apparatus, generally designated by reference numeral 930, that is configured to receive a narrative as an input. In the example of FIG. 9, the narrative is represented partly or completely by non-verbal input. In particular, the narrative is represented by detected objects in a scene, their interactions and/or evolution over time, e.g. as the scene is manipulated by the user. It will be appreciated that, in some embodiments, the narrative may be represented by a combination of a spoken narrative and the detected evolution of a scene. For example, a user may manipulate the objects within the scene while reciting a story and the interactive play apparatus may record the user's voice and capture the scene as it is being manipulated by the user.

The functional components of the interactive play apparatus 930 may be implemented by software modules executed by one or more processing units of the interactive play apparatus, and they may perform the process described in connection with FIG. 5. Some or all of the functional modules may be executed concurrently and feed their respective outputs into other processes. This may be useful in order to allow real-time processing of an input stream of input signals that represent a sequence of story elements (e.g. sentences, image captions, scene descriptions, etc.). It will be appreciated, however, that a different structure of the process may be implemented instead.

The system 930 comprises a scene analyser 931 which receives an input from one or more sensors, e.g. a sequence of images/video frames from a camera, electrical signals indicative of detected objects, and/or the like. Based on the received input, the scene analyser may detect objects in the scene, their locations, properties, behaviors, interactions and/or relations.

To this end, the scene analyser 931 may implement an object recognition process and a context detection process.

The object recognition process detects and recognizes one or more objects in a scene. For example, the object recognition process may detect objects in a scene by means of one or more trained Convolutional Neural Networks (CNN) receiving images of the scene from a camera, e.g. as described in WO 2016/075081 the entire contents of which are incorporated herein by reference. Alternatively or additionally, the object recognition process may receive signals from the objects, e.g. signals representing electrical signals between the objects or from any other type of input that can detect object location.

The context detection process may identify properties, behaviors, interactions and relations of detected objects. To this end, the context detection process may implement one or more context-trained Recurrent Neural Networks (RNN) or other suitable image captioning approaches.

For example, examples of contexts that may be recognised by the context detection process may depend on the type of object. For example:
- toy figurines can hold objects, walk, talk, or drive a car, but cannot fly
- cars can be driven by a toy figurine, but cannot talk or walk
- police cars can do the same as a car, but also start the flashing lights and siren The scene analyser 931 may repeatedly perform the object recognition process and the context detection process, e.g. so as to generate a sequence (e.g. time series) of events with object presence, properties, behaviors, interactions and relations describing the play intent and context: The sequence may be generated from frames in a video sequence and/or from multiple samples of electrical signals. The events thus represent story elements of a narrative played out by the objects in the scene, e.g. as the user manipulates the objects in the scene.

The output of the scene analyser is fed into the story translator 932 which may perform the higher level recognition tasks. In particular, the story translator may identify play intent and context based on collected events from the scene analyser. To this end, the story translator may implement one or more suitable event recognition methods such as methods based on Recurrent Neural Networks, Long-Short Term Memory (RNN, LSTM) or similar.

The story translator feeds the processed story elements into the story element transformer 933 which performs the mapping of story elements onto objects and behaviours/actions, e.g. as described in connection with FIGS. 6 and 7. It will be appreciated that, in some embodiments, the scene analyzer and the story translator may operate in passes, e.g. when the story translator sends feedback to the scene analyzer, based on which the scene analyzer forwards an updated story element. Similar feedback loops may also be implemented between other modules of the system.

The story element transformer feeds its output (e.g. the identified objects, their attributes and behaviours or a script or other suitable data structure), to the device controller 934. The device controller 934 updates the data structures representing the detected electronic devices 935, i.e. the data structures representing the current operational states of the electronic devices. The device controller and the story element transformer retrieve the current state of the electronic devices as a further input to their respective processing. Finally, the device controller 934 controls the operation of the electronic devices e.g. by transmitting respective instructions to them.

Figure 10A:
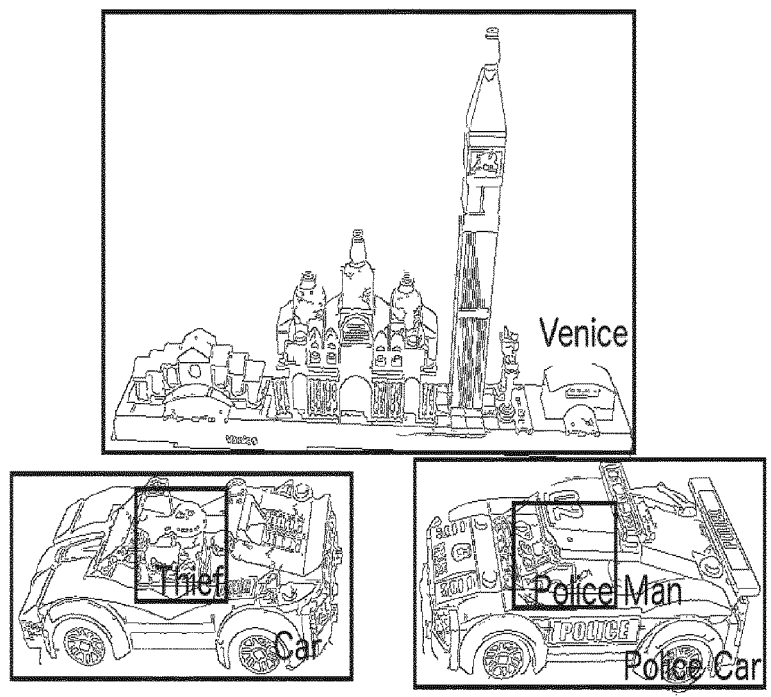
FIG. 10A-B illustrates an example of a recognized scene.
Figure 10B:
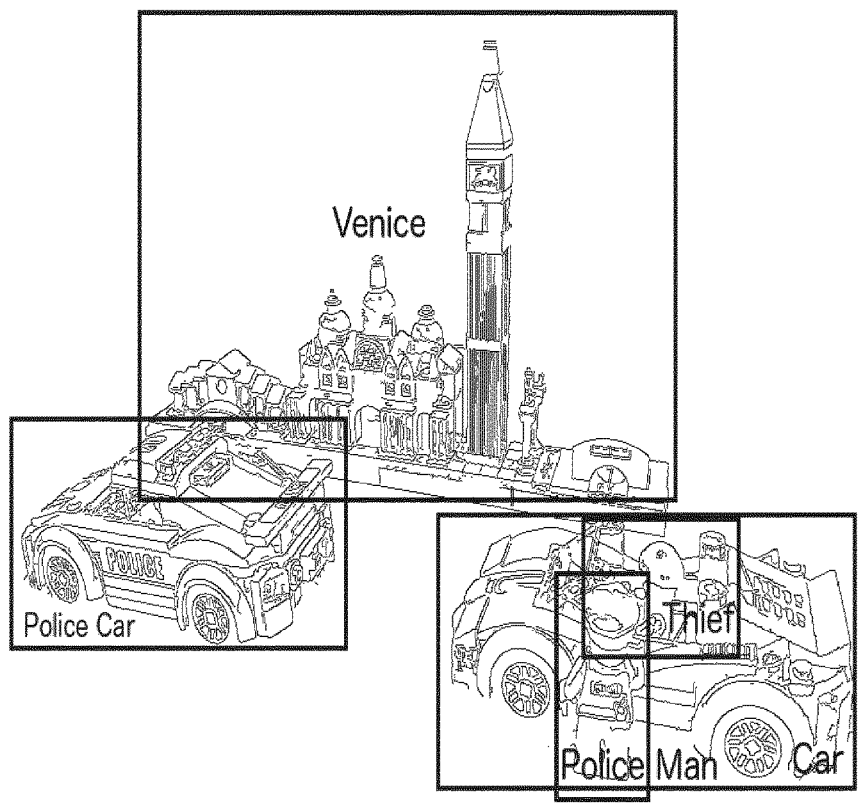

FIG. 10A-B illustrates an example of a recognized scene. In particular FIG. 10A shows an example of a first image of a scene that has been captured by a camera of an interactive play apparatus as described herein. FIG. 10B shows an example of a subsequent image of the same scene that has subsequently been captured by the camera of an interactive play apparatus as described herein. FIGS. 10A-B also illustrate frames indicating objects that have been recognized in the images by the object recognition process of the scene analyser. For example, the images of FIGS. 10A-B may be frames of a video sequence.

Based on the above recognized objects, the context detection process may e.g. deduce the following scene context: "A police man has caught a thief in Venice."

In particular, the scene analyzer may analyze the first image shown in FIG. 10A and create a first event "A police man in his police car is chasing a thief in Venice". Similarly, the scene analyzer may analyze the subsequent image shown in FIG. 10B and create a subsequent event "A police man has caught a thief in Venice". The scene analyzer may thus feed these events as a sequence of events into the story translator, e.g. a Context Algorithm such as a Recurrent Neural Network or the like, which determines an overall play intent or context from the sequence of events. For example, the story translator may determine the story element "The police is chasing a thief where the thief gets caught by the police in Venice".

The story element transformer may then cause a sound output device to output the sound of a police siren and subsequently shouting voices, and/or control a light source to simulate flashing police lights.

Accordingly, the process is capable of determining contextual meaning behind the objects in the scene and, hence, to understand the play intent of the user manipulating the objects in the scene.

For example, such a process may be implemented by a vision deep convolution neural network processing the received images, followed by a language generating recurrent neural network processing the output of the convolution neural network, Although the invention has been described with reference to certain specific embodiments, various modifications thereof will be apparent to those skilled in art without departing from the spirit and scope of the invention as outlined in claims appended hereto.

The invention claimed is:

1. An interactive play apparatus comprising:
   an input device configured to receive an input;
   one or more communications interfaces;
   one or more processors;
   wherein the one or more processors are configured to:
   a) detect one or more electronic devices;
   b) for each detected electronic device, determine one or more capabilities of said electronic device;
   c) receive one or more inputs via the input device, the one or more inputs indicative of a scene, the scene including one or more objects;
   d) detect the one or more objects within the scene;
   e) detect locations of the detected objects and/or relations between the detected objects;

f) extract a sequence of events occurring in the scene, each event involving one or more of the detected objects;
g) determine one or more user-perceptible play actions based at least in part on the received one or more inputs and the extracted sequence of events;
h) translate the determined one or more play actions into one or more instructions operable to cause one or more of the detected electronic devices to perform one or more functions that at least approximate the determined one or more play actions; wherein the translation is based at least in part on the detected one or more capabilities of the respective detected electronic devices; and
i) cause the one or more of the detected electronic devices to perform said one or more functions.

2. An interactive play apparatus according to claim 1, wherein the interactive play apparatus comprises a storage medium having stored thereon a set of play rules and wherein determining the one or more user-perceptible play actions is further based on the stored play rules.

3. An interactive play apparatus according to claim 2, wherein translating the determined one or more play actions comprises:
selecting one or more of the electronic devices based on the determined one or more play actions and the determined capabilities; and
determining, based on the determined capabilities of the selected electronic devices and on the determined one or more play actions; the instructions for the selected electronic devices.

4. An interactive play apparatus according to claim 1, wherein the received input is representative of a narrative comprising a sequence of story elements; and wherein the processor is configured to:
transform a first story element of the sequence of story elements into at least a first play action; and
determine the instructions based on the first play action and the detected one or more capabilities of the respective detected electronic devices.

5. An interactive play apparatus according to claim 1, wherein the capabilities include an output capability of an electronic device for producing one or more user-perceptible outputs by said electronic device.

6. An interactive play apparatus according to claim 1, wherein the capabilities include an input capability of an electronic device for acquiring one or more sensor inputs by said electronic device.

7. An interactive play apparatus comprising:
an input device configured to receive an input,
one or more communications interfaces,
one or more processors;
wherein the one or more processors are configured to:
  a) receive one or more inputs via the input device, the input being indicative of a scene, the scene including one or more objects;
  b) detect the one or more objects within the scene;
  c) detect locations of the detected objects and/or relations between the detected objects;
  d) extract a sequence of events occurring in the scene, each event involving one or more of the detected objects;
  e) determine one or more user-perceptible play actions based at least in part on the extracted sequence of events;
  f) translate the determined one or more play actions into one or more instructions operable to cause one or more electronic devices to perform one or more functions that at least approximate the determined one or more play actions; and
  g) cause the one or more of the detected electronic devices to perform said one or more functions.

8. An interactive play apparatus according to claim 7, wherein the one or more inputs comprise one or more images depicting the scene.

9. An interactive play apparatus according to claim 7, wherein the one or more inputs comprise one or more signals indicative of respective identities of the one or more objects and of at least relative locations of the objects within the scene and/or relations between the objects within the scene.

10. An interactive play apparatus according to claim 7, wherein the received input is representative of a narrative comprising a sequence of story elements.

11. An interactive play apparatus according to claim 10, wherein each story element comprises at least one sentence or other syntactic entity, and wherein the processor is configured to transform the first story element based on a context defined by one or more previous story elements of said sequence.

12. An interactive play apparatus according to claim 7, wherein the one or more processors are further configured to receive one or more environmental inputs indicative of an environmental parameter and wherein determining the one or more user-perceptible play actions and/or translating the determined one or more play actions is further based on the received one or more environmental inputs.

13. An interactive play apparatus according to claim 7, wherein the instructions include configured to cause two or more detected electronic devices to interact with each other.

14. An interactive play apparatus according to claim 7, wherein the input device comprises a voice recorder and wherein the received input comprises a recorded voice.

15. An interactive play apparatus according to claim 7, further comprising a library of electronic devices, the library having stored therein data records indicative of a plurality of known electronic devices, each data record comprising information of one or more capabilities of the respective electronic device.

16. An interactive play apparatus according to claim 7, wherein the processor is configured to record feedback information indicative of one or more parameters of a user session, the user session comprising receipt of the one or more inputs; and wherein the processor is configured to process a subsequent input based at least in part on the recorded feedback information.

17. A computer-implemented method of controlling an interactive play apparatus, the method comprising:
  a) detecting one or more electronic devices;
  b) for each detected electronic device, determining one or more capabilities of said electronic device;
  c) receiving one or more inputs via an input device, the one or more inputs indicative of a scene, the scene including one or more objects;
  d) detecting the one or more objects within the scene;
  e) detecting locations of the detected objects and/or relations between the detected objects;
  f) extracting a sequence of events occurring in the scene, each event involving one or more of the detected objects;

g) determining one or more user-perceptible play actions based at least in part on the received one or more inputs and the extracted sequence of events;
h) translating the determined one or more play actions onto one or more instructions operable to cause one or more of the detected electronic devices to perform one or more functions that at least approximate the determined one or more play actions; wherein the translation is based at least in part on the detected one or more capabilities of the respective detected electronic devices; and
i) causing the one or more electronic devices to perform the one or more functions.

18. A computer-implemented method of controlling an interactive play apparatus, the method comprising:
  detecting one or more electronic devices;
  for each detected electronic device, determining one or more capabilities of said electronic device;
  receiving one or more inputs via an input device, the inputs being indicative of a scene, the scene including one or more objects;
  detecting the one or more objects within the scene;
  detecting locations of the detected objects and/or relations between the detected objects;
  extracting a sequence of events occurring in the scene, each event involving one or more of the detected objects;
  determining one or more user-perceptible play actions based at least in part on the extracted sequence of events;
  translating the determined one or more play actions onto one or more instructions operable to cause one or more electronic devices to perform one or more functions that at least approximate the determined one or more play actions; and
  causing the one or more electronic devices to perform the one or more functions.

19. A data processing system configured to perform the computer-implemented method according to claim 18.

20. A computer program product comprising a computer program configured to cause, when executed by a data processing system, the data processing system to perform the steps of the method of claim 18.

21. The computer program product according to claim 20, embodied as a tangible computer-readable medium having stored thereon the computer program.

* * * * *